US009883393B2

(12) United States Patent
Dipaola

(10) Patent No.: US 9,883,393 B2
(45) Date of Patent: *Jan. 30, 2018

(54) SYSTEMS, APPARATUSES, AND METHODS FOR SECURE BEACON AUTHENTICATION VIA MOBILE DEVICES

(71) Applicant: INMARKET MEDIA LLC, Venice, CA (US)

(72) Inventor: Todd J. Dipaola, Venice, CA (US)

(73) Assignee: inMarkert Media LLC, Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/827,257

(22) Filed: Aug. 14, 2015

(65) Prior Publication Data

US 2015/0358819 A1  Dec. 10, 2015

Related U.S. Application Data

(63) Continuation-in-part of application No. 14/249,165, filed on Apr. 9, 2014, now abandoned, which is a
(Continued)

(51) Int. Cl.
*H04W 12/06* (2009.01)
*H04L 29/06* (2006.01)
(Continued)

(52) U.S. Cl.
CPC .......... *H04W 12/06* (2013.01); *H04B 1/3827* (2013.01); *H04L 63/107* (2013.01);
(Continued)

(58) Field of Classification Search
CPC .............. G01Q 20/3224; H04B 1/3827; H04L 9/3226–9/3228; H04L 12/1845;
(Continued)

(56) References Cited

U.S. PATENT DOCUMENTS

| 4,405,829 A | 9/1983 | Rivest |
| 4,720,860 A | 1/1988 | Weiss |

(Continued)

FOREIGN PATENT DOCUMENTS

WO   WO2012078190   6/2012

OTHER PUBLICATIONS

International Search Report and Written Opinion for PCT Patent Application PCT/US11/01962 dated Mar. 19, 2012.

*Primary Examiner* — Kevin Bechtel
(74) *Attorney, Agent, or Firm* — Inventive Patent Law P.C.; Jim H. Salter

(57) ABSTRACT

Systems, apparatuses, and methods for secure beacon authentication via mobile devices are disclosed. In some example embodiments, a verification element comprises: a memory storing a plurality of non-repeated verification codes; a wireless broadcast element; and a processing circuit electronically coupled to the memory and the wireless broadcast element, the processing circuit being configured to retrieve one of the non-repeated verification codes from the memory and to transfer the non-repeated verification code to the wireless broadcast element, the wireless broadcast element being configured to wirelessly broadcast the non-repeated verification code to a plurality of mobile devices for individual verification of the plurality of mobile devices, the non-repeated verification code being different than any other non-repeated verification code previously retrieved from the memory and used for individual verification of the plurality of mobile devices.

14 Claims, 21 Drawing Sheets

Related U.S. Application Data continuation of application No. 13/379,909, filed as application No. PCT/US2011/001962 on Dec. 9, 2011.

(60) Provisional application No. 61/421,380, filed on Dec. 9, 2010, provisional application No. 61/421,380, filed on Dec. 9, 2010.

(51) Int. Cl.
  *H04W 12/08* (2009.01)
  *H04B 1/3827* (2015.01)
  *H04W 64/00* (2009.01)
  *H04W 4/02* (2009.01)

(52) U.S. Cl.
  CPC .............. *H04W 4/02* (2013.01); *H04W 12/08* (2013.01); *H04W 64/003* (2013.01)

(58) Field of Classification Search
  CPC ....... H04L 63/08; H04L 63/107; H04L 67/18; H04W 4/008; H04W 4/02–4/022; H04W 4/025; H04W 12/04–12/08; H04W 12/12; H04W 64/00–64/003
  See application file for complete search history.

(56) References Cited

U.S. PATENT DOCUMENTS

| | | |
|---|---|---|
| 7,024,552 B1 * | 4/2006 | Caswell ............... G06Q 20/367 380/258 |
| 7,363,494 B2 | 4/2008 | Brainard |
| 7,962,361 B2 | 6/2011 | Ramchandani |
| 8,229,787 B2 | 7/2012 | Ramchandani |
| 8,422,667 B2 | 4/2013 | Fitzgibbon |
| 8,489,112 B2 | 7/2013 | Roeding |
| 8,549,643 B1 | 10/2013 | Shou |
| 2004/0186770 A1 | 9/2004 | Pettit |
| 2005/0071227 A1 | 3/2005 | Hammad |
| 2006/0200855 A1 * | 9/2006 | Willis ................ H04L 9/3213 726/2 |
| 2006/0249574 A1 | 11/2006 | Brown |
| 2008/0065509 A1 | 3/2008 | Williams |
| 2009/0003281 A1 | 1/2009 | Panabaker |
| 2009/0182597 A1 | 7/2009 | Bull |
| 2010/0100434 A1 | 4/2010 | Sock |
| 2011/0178862 A1 * | 7/2011 | Daigle ............... G06Q 30/0226 705/14.27 |
| 2012/0046068 A1 | 2/2012 | Katpelly |
| 2012/0197988 A1 | 8/2012 | Leppanen |
| 2012/0271913 A1 | 10/2012 | Tallgren |
| 2013/0046636 A1 | 2/2013 | Asnake |
| 2013/0100810 A1 * | 4/2013 | Slothouber ......... H04L 43/0882 370/235 |
| 2013/0217333 A1 | 8/2013 | Sprigg |
| 2013/0297416 A1 | 11/2013 | Dipaola |
| 2013/0325616 A1 | 12/2013 | Ramde |
| 2014/0143328 A1 | 5/2014 | Miller |
| 2014/0222685 A1 * | 8/2014 | Middleton ......... G06Q 30/0261 705/50 |

* cited by examiner

SYSTEMS, APPARATUSES, AND METHODS FOR SECURE BEACON AUTHENTICATION VIA MOBILE DEVICES

PRIORITY PATENT APPLICATIONS

The present application is non-provisional continuation-in-part patent application claiming priority to co-pending U.S. patent application Ser. No. 14/249,165; filed Apr. 9, 2014, which is a continuation application of, and claims priority to, U.S. patent application Ser. No. 13/379,909 filed Jul. 23, 2013, which claims priority to PCT Patent Application No. PCT/US11/01962 filed Dec. 9, 2011, which claims the benefit of U.S. Provisional Patent Application No. 61/421,380 filed Dec. 9, 2010. The present patent application draws priority from the referenced patent applications. The entire disclosure of the referenced patent applications is considered part of the disclosure of the present application and is hereby incorporated by reference herein in its entirety.

TECHNICAL FIELD

The various example embodiments disclosed herein generally relate to electronic device security, authentication of electronic devices and, more particularly, to systems, apparatuses, and methods for secure beacon authentication via mobile devices.

BACKGROUND

Currently, people are taking their mobile electronic devices everywhere with them in their daily lives and, therefore, uses and applications of mobile electronic devices are increasing at a rapid pace to accommodate people anywhere throughout their daily routines. Many of the new uses and applications of mobile electronic devices are in some manner associated with the commercial activity of the users. In some instances, a user may opt to use the mobile electronic device during commercial activity. It is important for these applications to provide a secure device and system authentication process and platform for these electronic device users and the related activity.

Thus, a need exists for systems, methods, and/or apparatuses that encourage and verify authenticity of the user's electronic device and activity. In addition, a need exists for systems, methods, and/or apparatuses that provide secure beacon authentication via mobile devices.

DETAILED DESCRIPTION

Figure 1:
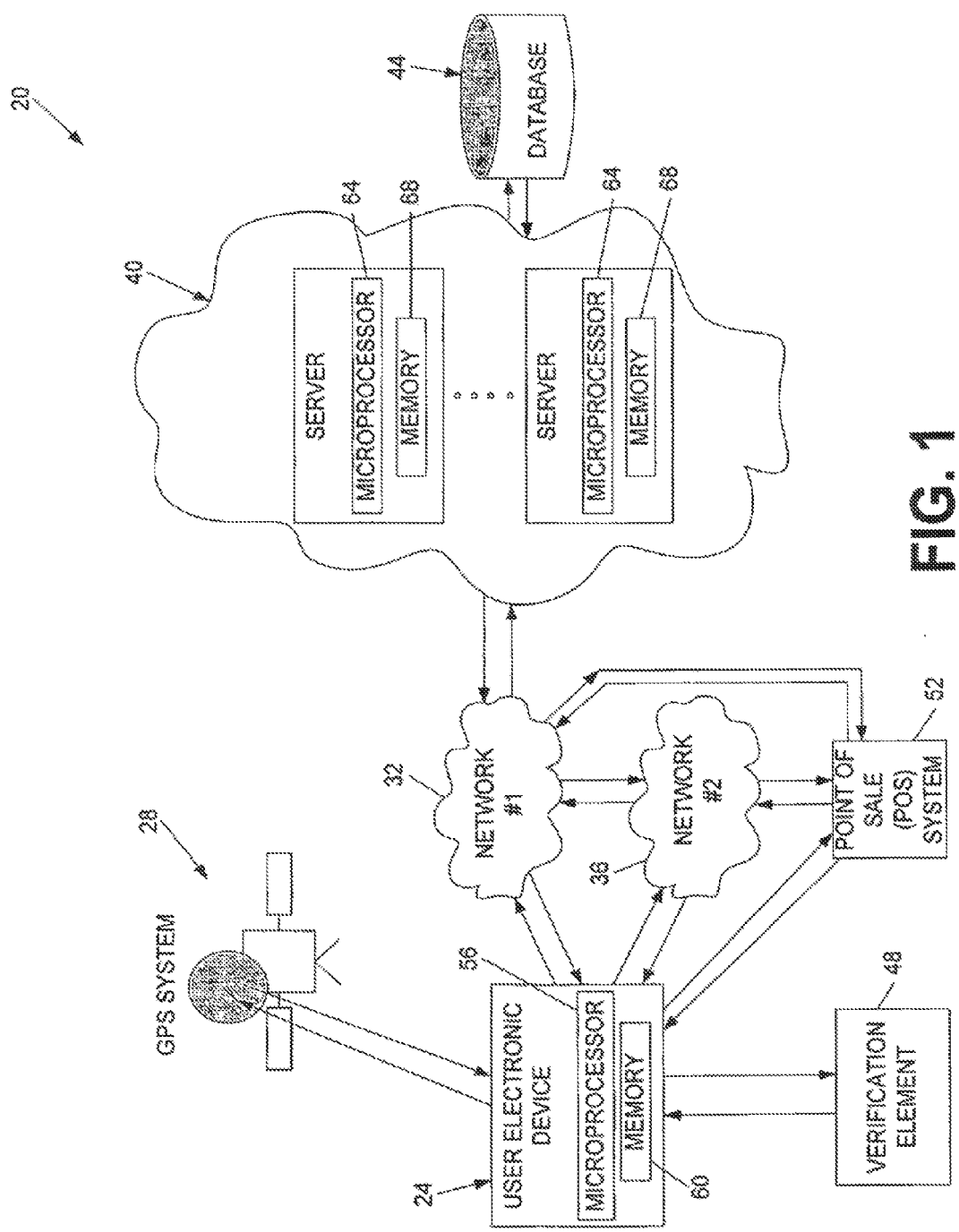
FIG. 1 is a block diagram of an example system for verifying user activity and providing value to users based on user activity, among other things.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

Disclosed herein are systems, methods, and apparatuses for interacting with users during user activity, providing value to the users based on their user activity, and verifying the authenticity of the user activity. The disclosed systems, methods, and apparatuses may also be used to strategically market to and/or survey the users based on their user activity and/or based on stated or implied preferences.

With reference to FIG. 1, a block diagram of an example system 20 of the disclosed example embodiments is illustrated. In this illustrated example embodiment, the system 20 includes a user electronic device 24, a global positioning system ("GPS") 28, a first network 32, a second network 36, a plurality of accessible servers 40, a storage device or database 44, a verification element 48, and a point of sale (POS) system 52. It should be understood that the example elements of the system 20 illustrated in FIG. 1 are provided for illustrative and example purposes to assist with an understanding of at least some of the many aspects of the disclosed example embodiments. These example elements are not intended to be limiting upon the disclosed example embodiments and the disclosed example embodiments are capable of having various other elements, which are intended to be within the spirit and scope of the disclosed example embodiments.

With continued reference to FIG. 1, the user electronic device 24 may be any type of user electronic device such as, for example: a mobile electronic device such as a smartphone, a personal digital assistant ("PDA"), a touch screen music player, a miniature laptop or tablet, etc.; a personal computer or laptop; a combination of a personal computer and a digital camera; or any other type of user electronic device. While the systems, methods, and apparatuses of the disclosed example embodiments are capable of utilizing any user electronic device, a "mobile electronic device" will be used hereinafter when referring to user electronic devices in order to provide a common theme throughout the description, simplify the following description, and for the sake of brevity. However, it should be understood that the use of "mobile electronic device" is not intended to be limiting upon the disclosure of the disclosed example embodiments. The illustrated example mobile electronic device 24 includes a microprocessor 56 and memory 60. While the illustrated example embodiment of the mobile electronic device 24 is shown only with a microprocessor 56 and memory 60, it should be understood that the mobile electronic device 24 is capable of having all necessary elements to carry out the disclosed example embodiments.

The example system also includes a conventional GPS 28, which is well known in the art and, therefore, will not be described herein in great detail. The mobile electronic device 24 communicates with the GPS 28 to determine the global coordinates of the mobile electronic device 24. Cellular tower and/or WI-FI triangulation via the internet may be utilized to determine the location of the mobile electronic device 24. Such triangulation is also well known in the art and will not be described herein in great detail. These methods for determining the location of the mobile electronic device. 24 may be used individually or may be used in any combination.

As illustrated in FIG. 1, the example system 20 includes a first network 32 and a second network 36. The first and second networks 32, 36 may be similar types of networks or may be different type of networks. For example, the first network may be the internet and the second network may be a cellular network. The mobile electronic device 24 may communicate with one or both of the first and second networks to send and receive data. Also, in the illustrated example embodiment, the first and second networks may communicate with each other to send and receive data. Further, the mobile electronic device 24 may utilize a cellular network, a WI-FI network, or a wireless local area network (WLAN) such as, for example, first and second networks 32, 36, in addition to or in lieu of the GPS 28 to determine the global coordinates of the mobile electronic device 24.

The plurality of servers 40 illustrated in the example system of FIG. 1: may be specifically designated for cooperation with the systems, methods, and apparatuses of the disclosed example embodiments; may be utilized in a cloud computing type environment; or may cooperate with the systems, methods, and apparatuses of the disclosed example embodiments in any other manner. The illustrated example servers 40 each include a microprocessor 64 and a memory 68. While the illustrated example servers 40 are shown only with a microprocessor 64 and memory 68, it should be understood that the servers 40 are capable of having all necessary elements to carry out the disclosed example embodiments. It should also be understood that the systems, methods, and apparatuses of the disclosed example embodiments may include any number of servers, including one, to carry out the disclosed example embodiments.

With further reference to the example system illustrated in FIG. 1, an example database 44 for storage of data is illustrated. While example FIG. 1 only illustrates a single database 44, the systems, methods, and apparatuses of the disclosed example embodiments are capable of including any number of databases 44 for storage of data and the one or more servers 40 are capable of communicating with the one or more databases 44 as needed to carry out the disclosed example embodiments. In addition, while the following description and accompanying figures may not specifically identify communication between the one or more servers 40 and the one or more databases 44, communication between the one or more servers 40 and the one or more databases 44 may occur as needed to carry out the disclosed example embodiments.

The example verification element 48 illustrated in FIG. 1 may be a wide variety of verification elements 48, which will be described in greater detail below. The mobile electronic device 24 and verification element 48 communicate with each other to verify the authenticity of the mobile electronic device 24, the location of the user, and user activity carried out by the user with the mobile electronic device 24. In some example embodiments, the verification element 48 may have a finite communication range. Thus, in such example embodiments, the mobile electronic device 24 may store or cache its communications and communicate with the verification element 48 once it is within the communication range of the verification element 48.

With continued reference to FIG. 1, the example POS system 52 may be a wide variety of POS systems 52 and POS systems 52 may generally be systems implemented at venues selling products and/or services to track sales, track user activity, perform various tasks associated with completing sales transactions, perform calculations using sales figures, accept loyalty cards and/or programs, process payments, provide sales receipts, and a variety of other tasks. Such POS systems 52 may include, for example, cash registers, auto-checkout devices, more advanced networked sales programming and devices, or any other programming and/or devices.

A variety of systems, methods, and apparatuses may be used to verify authenticity of user activity and provide value to users based on their user activity. The following description includes only some of the many systems, methods, and apparatuses capable of verifying authenticity of user activity and providing value to users based on their user activity, and is included for example and illustrative purposes and is not intended to be limiting upon the disclosed example embodiments.

Figure 2:
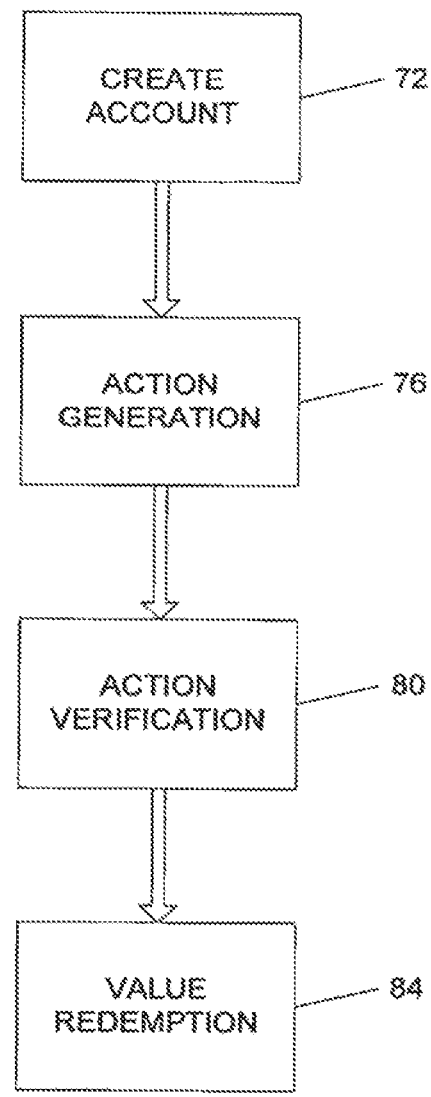
FIG. 2 is a flowchart of an example process of verifying user activity and providing value to users based on user activity.

Referring now to FIG. 2, a flowchart illustrates an example overview of providing value to users based on their user activity, verifying the authenticity of the user activity, and redeeming value accumulated by a user. Initially, a user creates or activates an account 72. After creating an account, action generation occurs 76, which requires the user to perform an activity or take a particular action. Next, action verification occurs 80, which includes the system verifying the authenticity of the user activity. After action verification, value redemption occurs 84, which includes the user redeeming value obtained as a result of performing the user activity. More details pertaining to each of the above steps will be described below.

It should be understood that the steps provided in the flowcharts of FIGS. 2-14 are only examples and the disclosed example embodiments are capable of including additional or fewer steps than those illustrated in FIGS. 2-14 and be within the intended spirit and scope of the disclosed example embodiments. It should also be understood that the order of steps illustrated in FIGS. 2-14 are only example and the steps may be performed in different orders relative to each other and be within the intended spirit and scope of the disclosed example embodiments.

Figure 3:
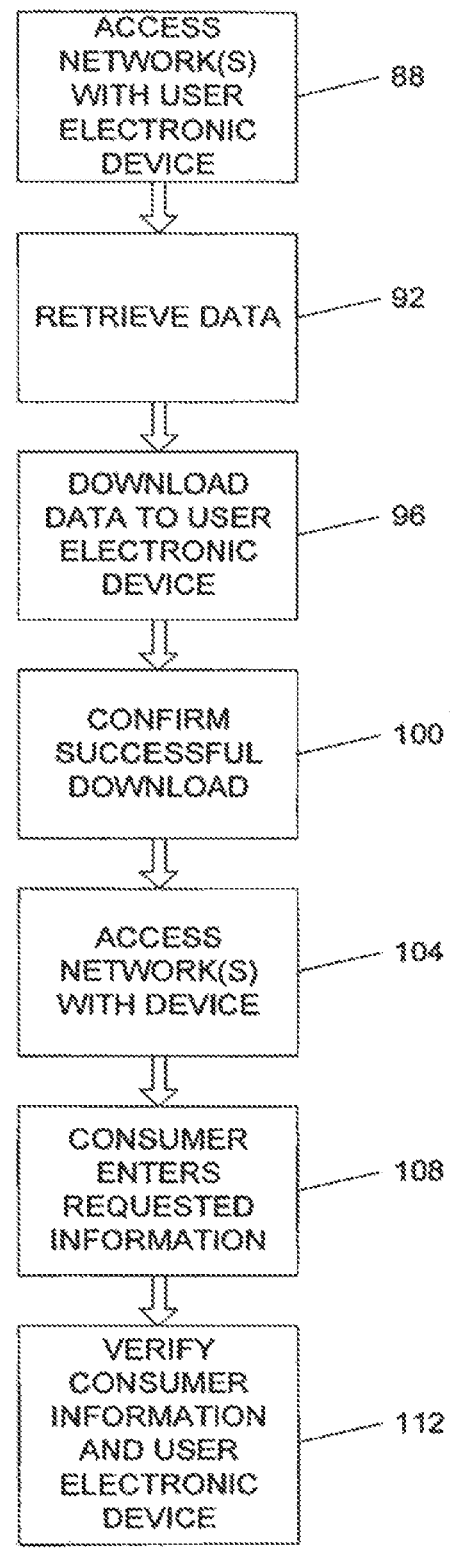
FIG. 3 is a flowchart of an example process of creating an account and verifying a user device.

With reference to FIG. 3, step 72 of FIG. 2 relating to a user creating or activating an account will be addressed in more detail. The following steps for creating an account are only example steps presented in an example order, and a variety of other steps, orders, and manners for creating an account are possible and are intended to be within the spirit and scope of the disclosed example embodiments. Initially, a user accesses one or more networks with the mobile electronic device 88. For example, the user may access the internet and/or a cellular network with their mobile electronic device. The mobile electronic device retrieves data 92 from one or more servers and/or the database via one or more networks. The retrieved data is associated with performing the disclosed example embodiments. After data retrieval, the mobile electronic device downloads and stores the data in the memory 96. The microprocessor assists with retrieval, downloading, and storage of the data. Upon completion of the data download, the mobile electronic device may send a confirmation 100 to one or more servers via one or more networks indicating that the download was successful. Alternatively, the one or more servers may send a confirmation to the mobile electronic device via one or more networks to determine if the download was successful. After the necessary data (e.g., operating software, etc.) is downloaded to the mobile electronic device, the mobile electronic device may access one or more networks 104 in order to communicate with and receive data from the one or more servers and one or more databases pertinent to the disclosed example embodiments. The user may enter relevant personal information 108 such as, for example, name, age, gender, home address, username, password, referral code, phone number, loyalty program, etc., which is sent to the one or more servers via one or more networks and stored in the memory of one or more servers or, in the alternative or in combination, stored in the one or more databases. This personal information may be retrieved at a later time for various reasons. After submission of the personal information, the system verifies authenticity of the user's information and the user's mobile electronic device 112.

The user's information and mobile electronic device may be authenticated in a variety of different manners and at a variety of different times such as, for example, during account creation, during location declaration, before, during, or after user activity, during purchases, during value redemption, etc. The following example embodiments of authentication are for illustrative and example purposes and are not intended to be limiting. Other authentication embodiments are possible and are intended to be within the spirit and scope of the disclosed example embodiments.

In one example embodiment, verification may be transparent to the user such that verification occurs without their active involvement. In other words, information and device verification occurs in the background. For example, upon establishing communication between the mobile electronic device and the one or more servers via the one or more networks, the one or more servers may communicate with the user's mobile electronic device to verify that the device is authentic. Various types of background verifying communication may occur between the one or more servers and the mobile electronic device. These may include communications relying on an active connection to a mobile telecommunication carrier's network to ensure that the electronic device is active, unique, and corresponds with the identifying information provided by the user. For example, a push notification or short message service (SMS) may be sent to the device 24 using its device token, UDID, telephone number, telephony ID, MAC address, etc.

This allows verification via a unique identifier on the network. It also eliminates multiple accounts on a verified device 24 and permits permanent banning of fraudulent accounts. This verification enables banning of a particular device, which is not feasible on personal computers via the internet. Personal computers are not tied to their communication platform with a unique identifiable number. While a particular IP address can be isolated on a network with a personal computer, the personal computer itself can be moved to a new network connection or a proxy server to generate a new IP address.

In another example embodiment, upon establishing communication between the mobile electronic device and the one or more servers via one or more networks, the one or more servers may send a communication to the mobile electronic device that is displayed on the mobile electronic device and requires a response from the user. Such communications may include, but are not limited to, emails, short message service (SMS) communications such as text messages, or any other type of communication. In such example embodiments, a challenge activity may be presented to the user and the user must respond in a particular manner in order for the mobile device to be authenticated. For example, the user may be required to answer a question, input a passcode, take a picture of himself/herself, take a picture of a particular item, scan a barcode that may be recorded for future verification via automated or manual methods, etc. If the user responds properly, then the mobile electronic device is authenticated and may be used in accordance with the disclosed example embodiments. If the user responds improperly or does not respond, the mobile electronic device is not authenticated and may not be used in accordance with the disclosed example embodiments until such time that it is authenticated.

In yet another example embodiment, upon establishing communication between the mobile electronic device and the one or more servers via the one or more networks, the one or more servers may send an automated telephone call to the mobile electronic device or an individual may place a manual call to the mobile electronic device (i.e., if the mobile electronic device is enabled for telephone communication). The user is required to respond to the automated or manual telephone call in a particular manner in order for the mobile device to be authenticated. For example, the user may be required to answer a question, provide additional information, enter a code, etc. If the user provides a proper response, then the mobile electronic device is authenticated and may be used in accordance with the disclosed example embodiments. If the user provides an improper response or the telephone call is not answered, the mobile electronic device is not authenticated and may not be used in accordance with the disclosed example embodiments until such time that it is authenticated.

In a further example embodiment, the user may be near a verification element 48 and the verification element 48 may authenticate the user's information and mobile electronic device as an authentic device. For example, the verification element may verify that the mobile electronic device is at a certain location through the use of modulating unpredictable, non-repeated communications or codes (described in more detail below). By this method, individuals cannot predict the verification element's current communication or code and misreport their presence. The mobile electronic device will receive, process, and transmit the securitized communication or code from the verification element to the one or more servers via the one or more networks. The one or more servers will compare the transmitted securitized communication or code, the location, and time transmitted to the expected code in order to verify the mobile electronic device's presence.

Figure 4:
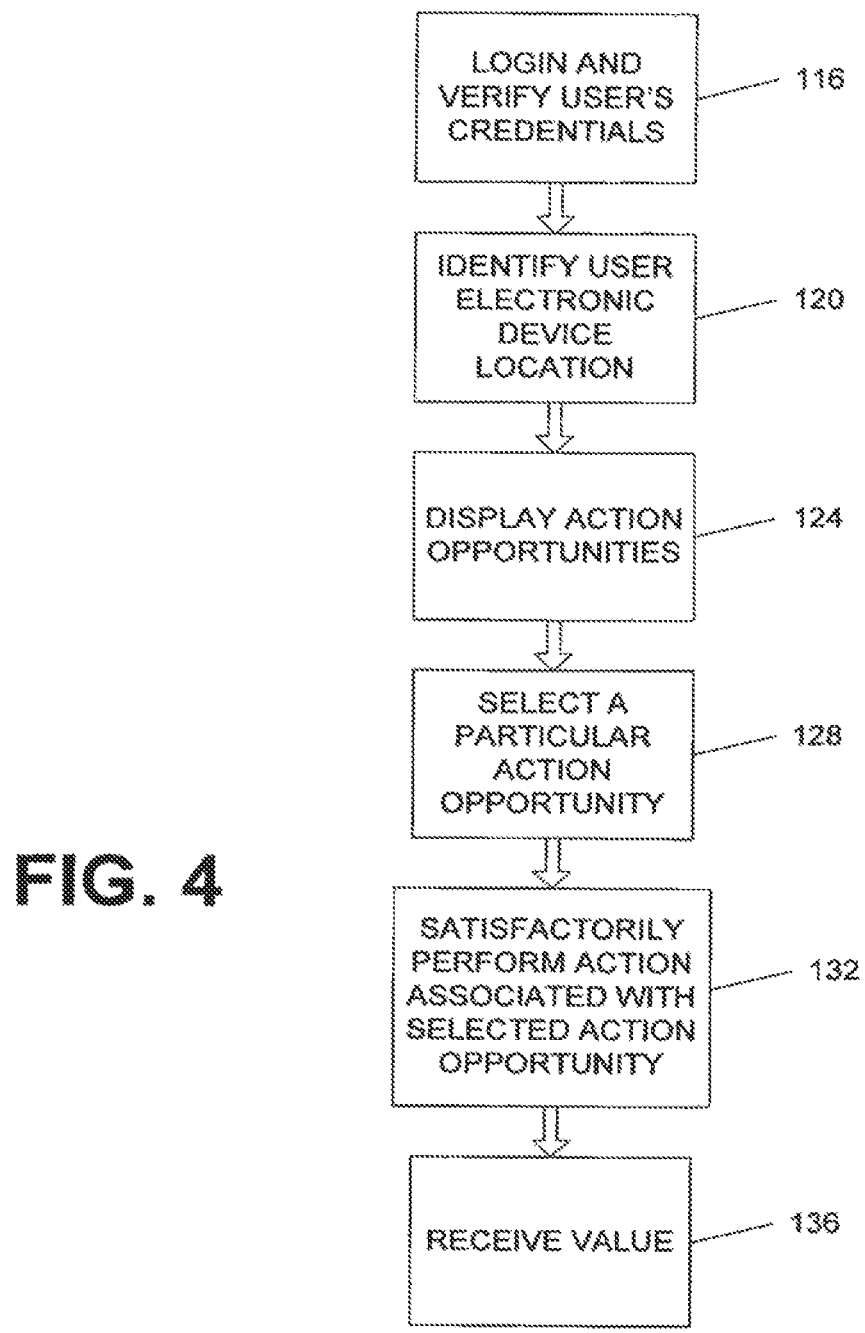
FIG. 4 is a flowchart of an example process of action generation.

Referring now to FIG. 4, step 76 of FIG. 2 relating to action generation will be addressed in more detail. As indicated above, action generation requires a user to perform an activity or take a particular action. The following steps for action generation are only example steps presented in an example order, and a variety of other steps, orders, and manners for action generation are possible and are intended to be within the spirit and scope of the disclosed example embodiments. Initially, a user may log into the system 116. This can occur automatically or a user may input a password or passcode, which is sent via one or more networks to one or more servers to indicate that the user is ready to initiate user activity. Next, the location of the user is identified 120 by identifying the location of the user's mobile electronic device. The location of the user's mobile electronic device may be identified in a variety of manners. In one example embodiment, the GPS system may communicate with the mobile electronic device to identify its location and, subsequently, the location of the mobile electronic device is sent to one or more servers via one or more networks. In another example embodiment, a cellular network or a WI-FI signal is capable of identifying the mobile electronic device's location and the identified location is sent to one or more servers via the cellular network and/or the internet. In still another example embodiment, one of the location verification methods may be coupled with a product scan to verify the location of the mobile electronic device. In yet another example embodiment, the location of the mobile electronic device maybe identified by a verification element located in the vicinity of the mobile electronic device.

The verification element 48 may be a wide variety of different verification elements and the following examples of verification elements are not intended to be limiting. The system is capable of including other verification elements and such other verification elements are intended to be within the spirit and scope of the disclosed example embodiments.

Figure 15:
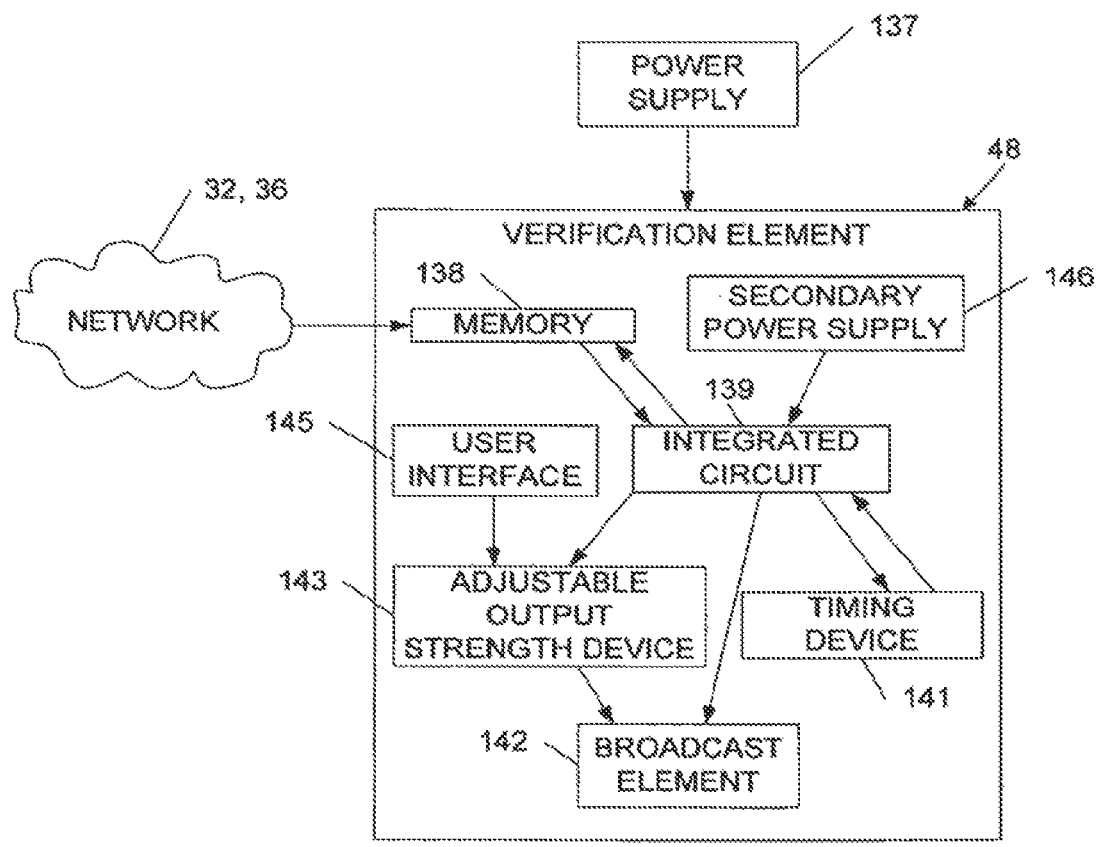
FIG. 15 is a block diagram of an example verification element that may be used with the system.

Referring now to FIG. 15, an example verification element 48 is illustrated. This example verification element 48 is powered by a power supply 137 such as, for example, an alternating current (AC) power supply, and communicates with at least one network such as, for example, the internet. The verification element includes memory 138, an integrated circuit 139, a timing device 141, a broadcast element 142, an adjustable output strength device 143, a user interface 145, and a secondary power supply 146. In this example illustrated embodiment, a large quantity of codes may be communicated to the verification element from one or more servers via the at least one network and stored in the verification element's memory. Such a conveyance of codes from the one or more servers to the verification element may occur a single time, in which case all the necessary codes would be communicated to the verification element in the single transfer of codes, or the one or more servers may periodically communicate codes to the verification element via the at least one network as desired.

The integrated circuit cooperates with the timing device, such as a clock, to retrieve codes from the memory at appropriate times and communicates the retrieved codes to the broadcast element for interaction with a user and his/her mobile electronic device. The integrated circuit retrieves and broadcasts non-repeated codes in a manner that is unpredictable to users, but is understood by the one or more servers such that when the user's mobile electronic device communicates verifying data to the one or more servers via the one or more networks, the one or more servers recognizes the verifying data and verifies the authenticity of the user's mobile electronic device.

The integrated circuit may retrieve codes from memory and communicate the codes to the broadcast element in any time increment and be within the intended spirit and scope of the disclosed example embodiments. For example, the integrated circuit may retrieve a new code from memory and communicate the new code to the broadcast element every 10 minutes, 30 minutes, hour, day, week, month, or any other period or time. Continually modulating verification codes inhibits fraudulent activity.

Instances may arise where the main power supply is not available for the verification element. The on-board secondary power supply may provide sufficient power to the verification element in order to maintain a desired level of operability. In some example embodiments, the secondary power source may power the verification element in a manner that facilitates complete operability of the verification element. In other example embodiments, the secondary power source may only power the timing device to ensure that the timing device continues to run and keep accurate time in instances where the main power supply is not available.

It should be understood that broadcasting a unique code is only one of the many manners of communication between the verification element and a mobile electronic device. Many other types of unique and secure communication may occur between the verification element and a mobile electronic device and be within the spirit and scope of the disclosed example embodiments. For example, other types of unique and secure communication between the verification element and a mobile electronic device include visual images, sonic communications through in-audible high frequency sound, changing WIFI identification such as, for example, MAC address, through IP based communication, RFID or NFC, etc.

The verification element may be located in a wide variety of venues having a wide range of spaces. It may be desirable to have the verification element broadcast codes in an area complementary to the area of the venue in which the verification element is positioned. A big box store may have a large retail space footprint, while a small convenience store may have a small retail space footprint. It may not be desirable to have the broadcast element output a signal of similar strengths for the big box retail store and the small convenience store. Thus, the verification element may include an adjustable output strength device for adjusting the output strength of the signal broadcast by the broadcast element. The adjustable output strength device may be appropriately adjusted so that the verification element broadcast a stronger signal for a big box store and a weaker signal for a small convenience store, thereby coordinating the strength of the broadcast signal with the environment in which the verification element is located. The adjustable output strength device may be adjustable in a variety of manners such as, for example, manually via a user interface, automatically with the integrated circuit, through the network from a location other than the venue in which the verification element is located, or any of a variety of other manners, all of which are intended to be within the intended spirit and scope of the disclosed example embodiments.

Figure 16:
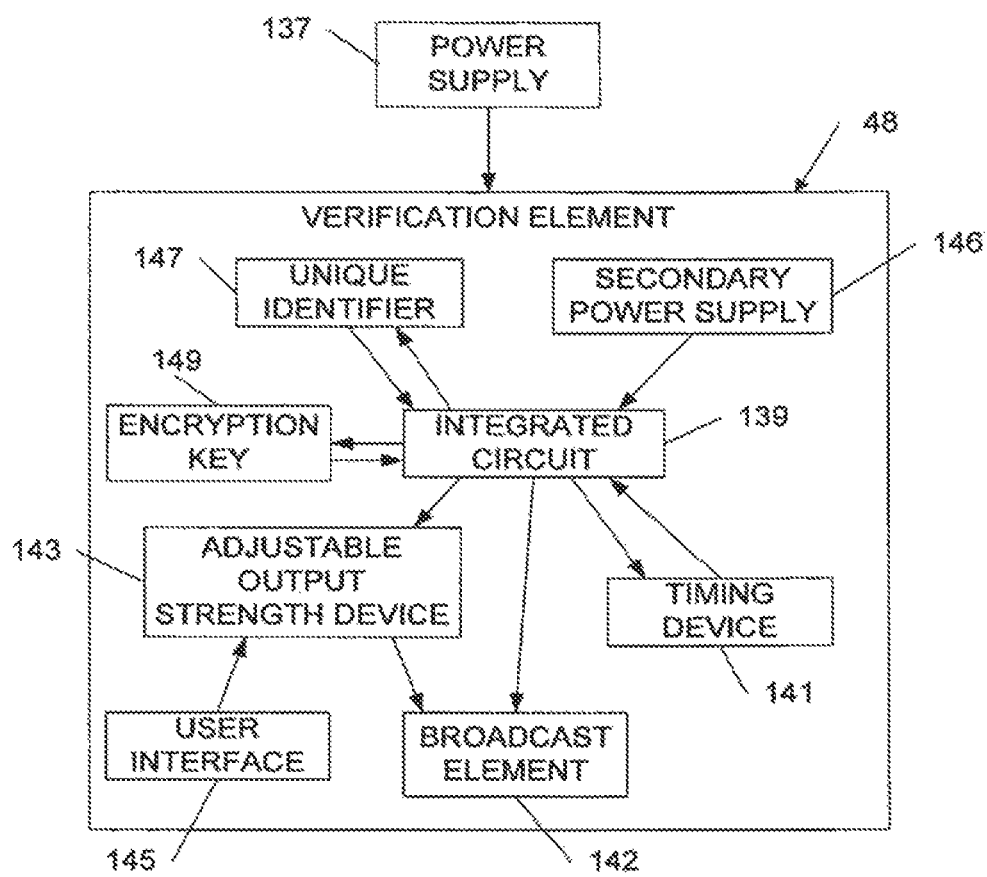
FIG. 16 is a block diagram of another example verification element that may be used with the system.

Referring now to FIG. 16, another example verification element 48 is illustrated. This example verification element 48 is powered by a power supply 137 such as, for example, an alternating current (AC) power supply, and includes an integrated circuit 139, a unique identifier 147, an encryption key 149, a timing device 141, a broadcast element 142, an adjustable output strength device 143, a user interface 145, and a secondary power supply 146.

In this example illustrated embodiment, the integrated circuit cooperates with the unique identifier, the encryption key, and the timing device to generate non-repeated, unpredictable codes, apply an encryption to the codes, and communicate the codes to the broadcast element for interaction with a user and his/her mobile electronic device. The integrated circuit retrieves, encrypts, and broadcasts non-repeated codes in a manner that is unpredictable to users, but the broadcast non-repeated codes will match unpredictable codes derived by one or more servers utilizing a similar process and algorithm such that when the user's mobile electronic device communicates verifying data to the one or more servers via the one or more networks, the one or more servers recognizes the verifying data and verifies the authenticity of the user's mobile electronic device.

Each verification element has a unique identifier and encryption key, which are never broadcast. The integrated circuit transforms the unique identifier using the encryption key and the precise time to regularly modulate non-repeated, unpredictable codes. Since it is not possible for someone receiving the non-repeated, unpredictable code to determine the original unique identifier and encryption key, all codes remain non-repeated and unpredictable, except to the servers that can generate their own matching codes because they have the unique identifier, encryption key, and current time. Periodically, the server may compare the received non-repeated, unpredictable code to its expected and internally generated non-repeated, unpredictable code at a particular date and time. If the code does not match exactly for the particular time, but matches another expected code in a designated window before or after, the server may incorporate a time offset to sync the verification element's clock with its own. For example, the timing device of the verification element may not be in sync with the timing device of the one or more servers (e.g., the timing devices may be off a few seconds, minutes, hours, etc.). Thus, the code generated by the verification element and communicated by the user's mobile electronic device may not match the code generated by the one or more servers. This syncing capability accommodates such inconsistent codes and may still authenticate the code sent by the user's mobile electronic device, thereby ultimately authenticating the user's mobile electronic device.

The integrated circuit may retrieve, encrypt, and communicate codes to the broadcast element in any time increment and be within the intended spirit and scope of the disclosed example embodiments. For example, the integrated circuit may retrieve, encrypt, and communicate a new code to the broadcast element every 10 minutes, 30 minutes, hour, day, week, month, or any other period of time. Continually modulating verification codes inhibits fraudulent activity.

Instances may arise where the main power supply is not available for the verification element. The on-board secondary power supply may provide sufficient power to the verification element in order to maintain a desired level of operability. In some example embodiments, the secondary power source may power the verification element in a manner that facilitates complete operability of the verification element. In other example embodiments, the secondary power source may only power the timing device to ensure that the timing device continues to run and keep accurate time in instances where the main power supply is not available.

Similarly to the example verification element illustrated in FIG. 15, the example verification element illustrated in FIG. 16 may be located in a wide variety of venues having a wide range of spaces. The example verification element illustrated in FIG. 16 includes all the same structure and operability as the example verification element illustrated in FIG. 15 in order to adjust the broadcast strength of the broadcast element. Thus, for the sake of brevity, such structure and operability will not be repeated herein. Rather, reference is made to the description above pertaining to the example verification element illustrated in FIG. 15.

The broadcast element described herein and illustrated in FIGS. 15 and 16 may be a variety of different types of elements for broadcasting the modulating non-repeated, unpredictable codes. For example, the broadcast element may be a WI-FI, WLAN, or other antenna enabled device for broadcasting a signal, a sonic device, or an electronic display or monitor.

The following is an example of a WI-FI, WLAN, or antenna enabled broadcasting device. A periodically modulating SSID verification element may be a wireless router type of device capable of automatically changing its wireless network name (service set identifier, SSID, etc.) or MAC address, which can be picked up and transmitted via a WI-FI, WLAN, or other antenna equipped electronic device to one or more servers. These strings may correspond to a code periodically and securely sent to the verification element over one or more networks such as, for example, the internet. Alternatively, without need for a network or internet connection, these strings may be a non-predictable code that is independently algorithmically generated both at the one or more servers and the verification element from a fixed code and encryption key, corresponding to the electronic mobile device, and one or more dynamic variables, based on the current time. The one or more servers compare the non-predictable code to the code sent from the electronic mobile device to verify if the electronic mobile device is near a particular verification element at a given time. Alternatively, the verification element and one or more servers may have a preset schedule of codes unique to each particular verification element at a given time. This signal can be transmitted by the electronic mobile device to one or more servers for verification. The modulating SSID verification element may also include a method to calibrate the intensity of signal transmission so that the range of the verification element may be adjusted to fit the eligible parameters of the venue. This modulating SSID verification element may take the form of a wireless router with the notable exception that it does not need to be connected to the internet as it only needs to broadcast its identifying information via SSID and/or MAC address to the electronic mobile device. The modulating SSID verification element may include an internal clock, battery, and preset unique codes. The modulating SSID verification element may also include a method to calibrate the intensity of signal transmission so that the range of the device may be adjusted to fit the eligible parameters of the venue. By way of example, a large store with the verification element in the middle of the store might have the signal intensity set to a maximum. A small store or one with the verification element placed near an entryway might have the transmission intensity set to a minimum.

The following is an example of a sonic broadcasting device. A periodically modulating high frequency sonic verification element is a device capable of generating ultrasound outside of human hearing at particular pitches in particular patterns. These patterns correspond to a code that can be modulated automatically as described below. This auditory signal can be picked up via microphone on a mobile electronic device and transmitted to one or more servers for verification via one or more networks. The sonic verification element may also include a method to calibrate the intensity of signal transmission so that the range of the verification element may be adjusted to fit the intended eligible parameters of the venue. By way of example, a large store with the verification element in the middle of the store might have the signal intensity set to a maximum. A small store or one with the verification element placed near an entryway might have the transmission intensity set to a minimum.

The following is an example of the broadcasting device comprising an electronic display or monitor. A periodically modulating barcode producing verification element may include a display that displays a periodically changing barcode. This barcode may be a one dimensional barcode, a QR code, a two dimensional barcode, a universal product code (UPC), etc. The user may scan the displayed barcode with the mobile electronic device's on-board camera and the mobile electronic device may send the captured scan to one or more servers via one or more networks for identification. The system will be able to verify the location of the mobile electronic device based on the scanned barcode. It should be understood that the periodically changing barcode may be modulated at any desired increment. It should also be understood that the barcode may instead be other images and such other images may be modulated at any desired increment.

As used herein, the term "scan" may be interpreted to include any type of scanning technology for scanning any type of image and/or may be interpreted to be any type of digital imaging such as, for example, a digital picture taken with a digital camera. In addition, a "scan" may be, among other things, an image captured with a user electronic device and may include a digital picture of the image as well as the decoded string of data from the image. Further, a "scan" may be any image or any data captured by a user electronic device.

Modulating codes transmitted by verification elements protect against fraudulent reproduction of their signal to gain undeserved value. Such verification elements are modulated in a manner so that the one or more servers can match a particular code from a particular verification element at a particular time, while other people cannot predict that code. Several methods exist to synchronize these codes and such methods are unpredictable so that fraudulent value is not obtained. These strings may correspond to a code periodically and securely sent to the verification element over one or more networks such as, for example, the internet.

Alternatively, without need for an internet connection, these strings may be a non-predictable, non-repeated code that are independently algorithmically generated both at the one or more servers and the verification element from a fixed code, corresponding to the electronic mobile device, and one or more dynamic variables, based on the current time. The one or more servers compare its non-predictable code to the code sent from the electronic mobile device to verify if the electronic mobile device is near a particular verification element at a given time. Alternatively, the verification element and one or more servers may have a preset schedule of codes unique to each particular verification element at a given time. These methods may require a clock, battery power supply for the clock, active or passive storage for underlying code, list of codes, and/or algorithm for generating codes. In addition, a method for calibrating the one or more servers and the timing device may need to occur. This code will be transmitted by the mobile electronic device to one or more servers for verification via one or more networks.

Once the system identifies the location of the user, the mobile electronic device may display the action opportunities 124 near the location of the user. For example, if the user is near a grocery store, one of the displayed action opportunities may relate to performing an action associated with the grocery store. Once the action opportunities are displayed on the mobile electronic device, the user selects one or more of the action opportunities 128. Next, the user satisfactorily performs the action(s) associated with the selected action opportunity(ies) 132. Satisfactorily performing actions associated with action opportunities will be described in more detail below. Upon satisfactory performance of the action, the user receives value 136. Such value may be a wide variety of different types of value including, but not limited to, advertising, redeemable/reward points, coupons, special offers, gift certificates, money, user goods, charitable contributions, sweepstakes entries, airline miles, features in an App, product review information, storing grocery list, sweepstakes, or anything else of value.

Example user activity relating to FIG. 4 will be described herein for illustrative purposes and is not intended to be limiting upon the disclosed example embodiments. For example, a user may be in a particular city and may activate/log into the system. The system will identify the user's location in the particular city and display numerous action opportunities on the user's mobile electronic device. A few example action opportunities may include a nearby restaurant, a coffee shop, a grocery store, a convenience mart, etc. and a map, directions, and/or a distance from the action opportunities may also be displayed on the mobile electronic device. As an example, the user may choose to go to the nearby grocery store. One or more particular actions such as, for example, checking into a grocery store, scanning a particular product, etc., may be associated with the chosen grocery store. If the user satisfactorily performs the one or more actions, the user will receive value such as, for example, points, coupons, gift certificates, money, user goods, charitable contributions, any of the other types of value disclosed herein, or anything else of value.

A variety of different types of actions may be generated and such actions may have different requirements for performing and/or completing the actions satisfactorily. The following paragraphs relating to FIGS. 5-9 describe a few example actions generated and a few example manners of satisfactorily performing the example actions. The following example actions and manners of satisfactorily performing the actions are for example and illustrative purposes and are not intended to be limiting. A wide variety of other actions and manners of satisfactorily performing the actions are possible and are intended to be within the spirit and scope of the disclosed example embodiments.

Figure 5:
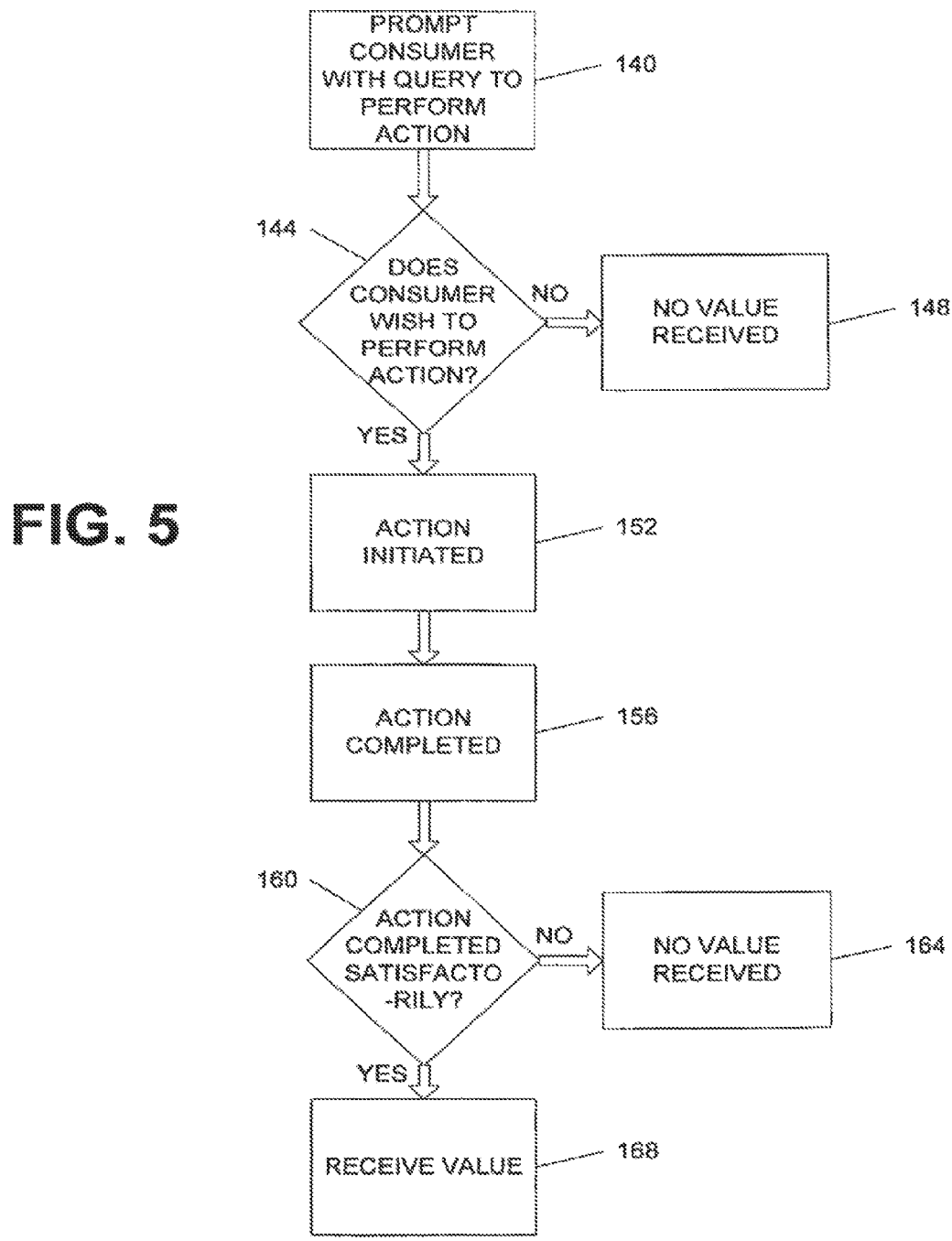
FIG. 5 is a flowchart of an example process of performing an action to determine whether or not a user will receive value.

Referring now to FIG. 5, an example manner of satisfactorily performing a selected action, which is generally represented as step 132 in FIG. 4, is illustrated and will be described in more detail. After a user selects an action (see step 128 in FIG. 4), a user is prompted via the display 140 on the mobile electronic device if he/she wishes to perform the action 144. If the user does not wish to perform the action, the user does not receive any value 148. If the user wishes to perform the action, the user initiates the action 152 and completes the action 156. Upon completion of the action, the system determines if the action was completed successfully 160. If the user does not complete the action satisfactorily, the user does not receive value 164. If the user completes the action satisfactorily, the user receives value 168. Step 168 shown in FIG. 5 pertaining to the user receiving value may correspond to step 136 shown in FIG. 4 pertaining to the user receiving value.

Example user activity relating to FIG. 5 will be described herein for illustrative purposes and is not intended to be limiting upon the disclosed example embodiments. In some instances, a user may be asked if they would like to perform a particular action such as, for example, go to a grocery store and scan a particular item. If the user does not want to go to the grocery store, then the user will not receive value. If the user does wish to go to the grocery store and scan the particular item, the user travels to the grocery store and scans the particular item. Then, the system determines if the user went to the grocery store and scanned the item. If the user did not go to the grocery store or did not scan the particular item, the user will not receive value. If the user does travel to the grocery store and scans the particular item, the user will receive value.

Figure 6:
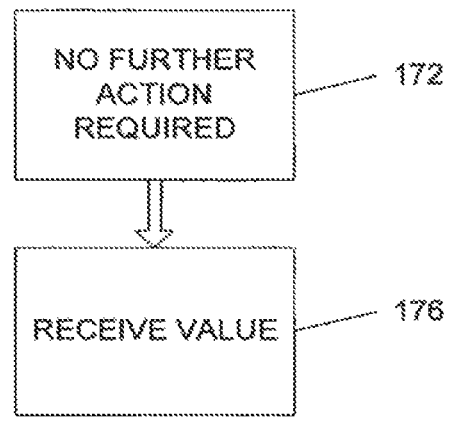
FIG. 6 is a flowchart of another example process of performing an action to determine whether or not a user will receive value.

Referring now to FIG. 6, another example manner of satisfactorily performing a selected action, which is generally represented as step 132 in FIG. 4, is illustrated and will be described in more detail. In some instances, the selected action does not require a significant investment of time and effort by the user. FIG. 6 illustrates such an instance. In this example instance, the user is not required to perform any additional activity 172 after selection of the action in order to receive value 176. In other words, the user may automatically receive value associated with certain actions. In some example embodiments, authentication of the electronic mobile device may occur prior to receipt of value. The mobile electronic device may be authenticated in any of the authentication or verification manners described herein or any other possible manner. After authentication, the user receives value 176. Step 176 shown in FIG. 6 pertaining to the user receiving value may correspond to step 136 shown in FIG. 4 pertaining to the user receiving value.

Example user activity relating to FIG. 6 will be described herein for illustrative purposes and is not intended to be limiting upon the disclosed example embodiments. An example instance where a user may receive value for performing no additional activity may include activating an account. After activating an account, the user may receive value without performing any action.

Figure 7:
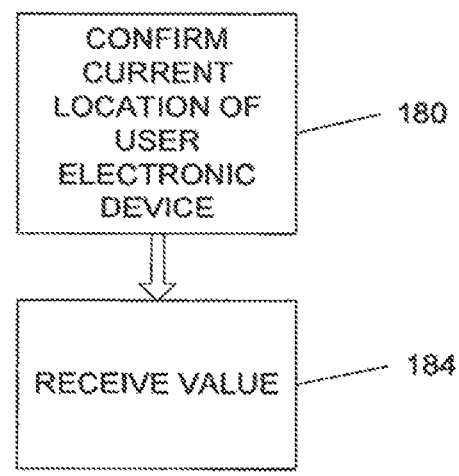
FIG. 7 is a flowchart of yet another example process of performing an action to determine whether or not a user will receive value.

Referring now to FIG. 7, yet another example manner of satisfactorily performing a selected action, which is generally represented as step 132 in FIG. 4, is illustrated and will be described in more detail. Similarly to FIG. 6, FIG. 7 illustrates one of many possible example instances where the selected action does not require a significant investment of time and effort by the user. However, as illustrated in FIG. 7, some instances requiring little activity by the user may include activity in the background possibly without explicit user action in order for the user to receive value. For example, in FIG. 7, the system may desire to confirm the user's location 180 prior to the user receiving value 184. The system identifies the user's location by identifying the location of the user's mobile electronic device. The location of the user's mobile electronic device may be identified in any of the variety of manners described herein or any other possible manner. After the user's location is identified, the user receives value 184. Step 184 in FIG. 7 pertaining to the user receiving value may correspond to step 136 in FIG. 4 of the user receiving value.

Example user activity relating to FIG. 7 will be described herein for illustrative purposes and is not intended to be limiting upon the disclosed example embodiments. An example action may require a user to "check-in" at a particular venue such as, for example, a grocery store. All the user needs to do to receive value is travel to the grocery store. The system will identify that the user is at the grocery store by identifying the location of the user's mobile electronic device. Upon arrival of the user at the grocery store, the user will receive value automatically (i.e., without actively performing a significant quantity of other steps or actions).

Figure 8:
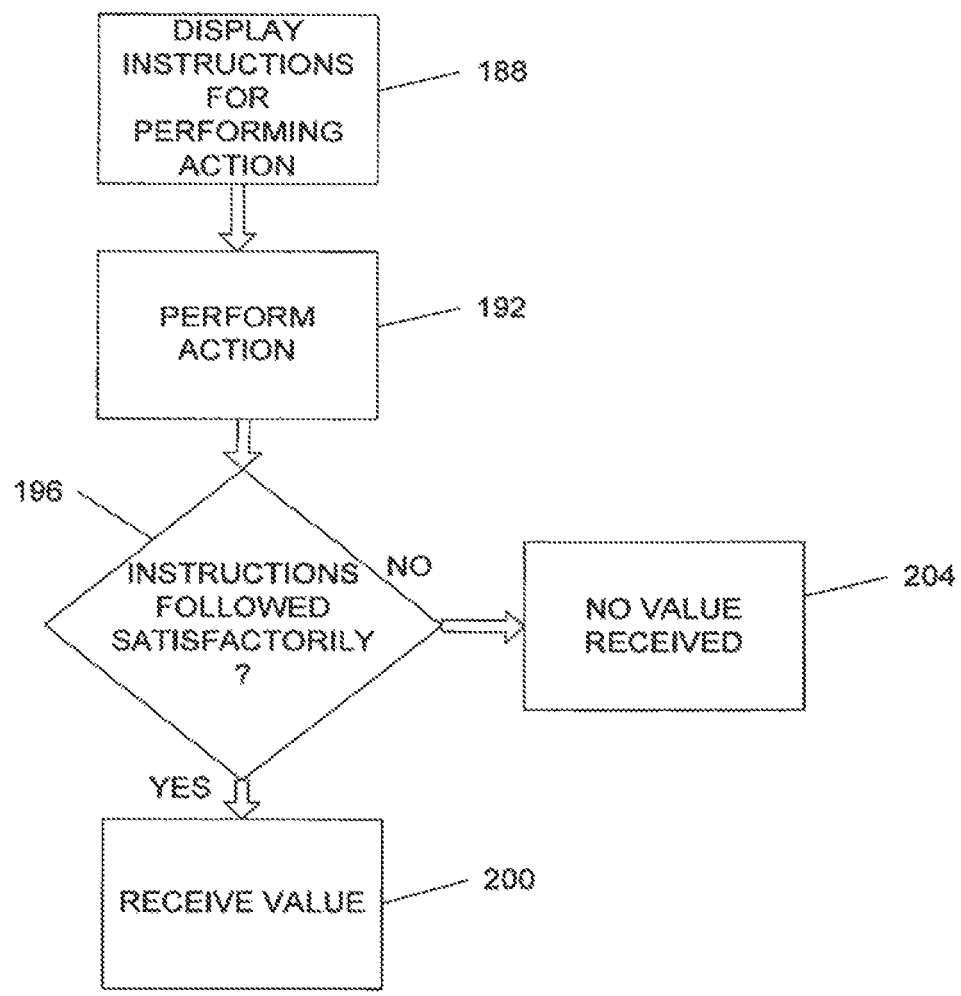
FIG. 8 is a flowchart of still another example process of performing an action to determine whether or not a user will receive value.

Referring now to FIG. 8, still another example manner of satisfactorily performing a selected action, which is generally represented as step 132 in FIG. 4, is illustrated and will be described in more detail. After the user selects an action (see step 128 in FIG. 4), the system displays the instructions on the display of the mobile electronic device 188 that are required for satisfactorily performing the action. Next, the user performs an action 192 and the system determines if the instructions were followed 196 when the user performed the action. If the user performed an action in accordance with the displayed instructions, the user receives value 200. If the user performs an action that does not follow the displayed instructions, the user does not receive value 204. Step 200 in FIG. 8 pertaining to the user receiving value may correspond to the step 136 in FIG. 4 of the user receiving value.

Example user activity relating to FIG. 8 will be described herein for illustrative purposes and is not intended to be limiting upon the disclosed example embodiments. An example action pertaining to FIG. 8 may include displaying instructions on a user's mobile electronic device that instruct the user to travel to a particular venue such as, for example, a grocery store, and perform particular activities at the grocery store. For example, the instructions may instruct the user to go to the store, find a particular brand of cereal, and purchase the cereal. In response to the instructions, the user performs an action or actions. The system then determines if the user satisfactorily followed the instructions with his/her action(s). If the user did not satisfactorily follow the instructions, the user does not receive value. If the user satisfactorily follows the instructions, the user receives value. Other example user activities that may relate to FIG. 8 include, but are not limited to, displaying instructions for downloading a particular application and downloading the particular application to receive value, displaying instructions to complete a survey and responding to the survey to receive value, displaying instructions for publicizing actions or messages to one or more social networks and publicizing actions or messages to the one or more social networks to receive value, displaying instructions to enter a promotional code and entering a promotional code to receive value, etc.

Figure 9:
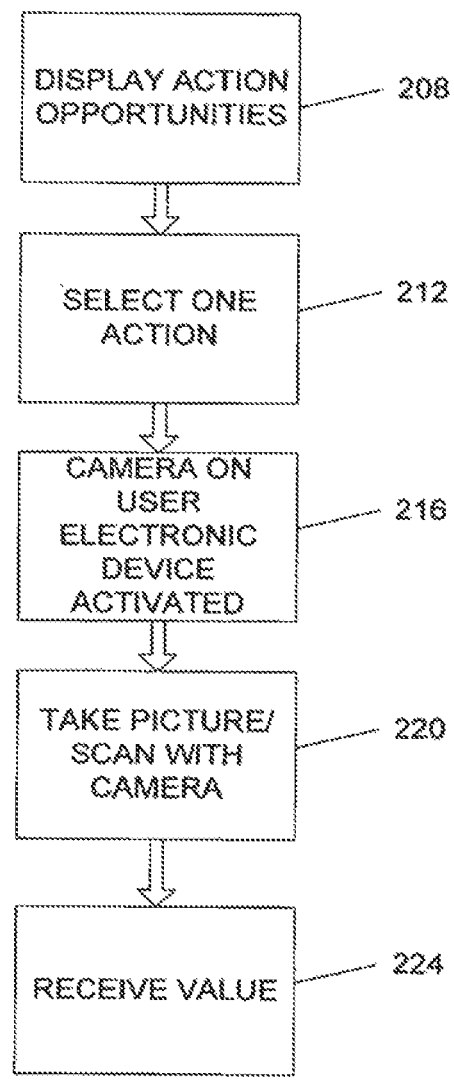
FIG. 9 is a flowchart of a further example process of performing an action to determine whether or not a user will receive value.

Referring now to FIG. 9, a further example manner of satisfactorily performing a selected action, which is generally represented as step 132 in FIG. 4, is illustrated and will be described in more detail. After the user selects an action (see step 128 in FIG. 4), the system may display a plurality of secondary action opportunities associated with the selected action 208. The user then selects one of the secondary action opportunities 212. In the illustrated example embodiment, after the user selects the secondary action opportunity, the camera on the mobile electronic device activates 216. After activation of the camera, the user takes a picture or scans an item or a portion of the item, such as, for example, a barcode, associated with the selected secondary action opportunity 220. The user then receives value 224. Step 224 in FIG. 9 pertaining to the user receiving value may correspond to the step 136 in FIG. 4 of the user receiving value.

Example user activity relating to FIG. 9 will be described herein for illustrative purposes and is not intended to be limiting upon the disclosed example embodiments. For example, a user may be at a convenience store and one or more action opportunities associated with the convenience store may be displayed on the user's mobile electronic device. One such displayed action opportunity may include, for example, finding a particular brand of potato chips, scanning the bag of potato chips, and receiving value for scanning the bag of potato chips.

As indicated above, a variety of different actions and value opportunities exist beyond the example actions and value opportunities described herein. Another example action and value opportunity includes receiving value for referring another user to the system. Referral actions and value receipt for the referral actions may be achieved in a variety of different manners. For example, a current user may provide a referral code to a new prospective user and, upon registration of the new user, the new user enters the referral code and the current or first user receives value. Also, for example, a current user may provide a registration link to a new prospective user and the new prospective user may follow the registration link to ultimately register as a new user. If the new user follows the link and becomes a new registered user, the current or first user receives value.

Unfortunately, in instances where users receive any type of value, there will be those people who perform fraudulent activity in order to deceive the system and receive value to which they are not entitled. Thus, the disclosed example embodiments include numerous systems, methods, and apparatuses to provide an audit trail of actions, verify authentic user activity, provide value for such authentic activity, and also identify fraudulent activity and withhold value for such fraudulent activity. The following examples of verifying authentic activity are provided for example and illustrative purposes and are not intended to be limiting. In addition, the following examples are only some of the many possible manners of verifying authentic activity, all of which are intended to be within the intended spirit and scope of the disclosed example embodiments.

Figure 10:
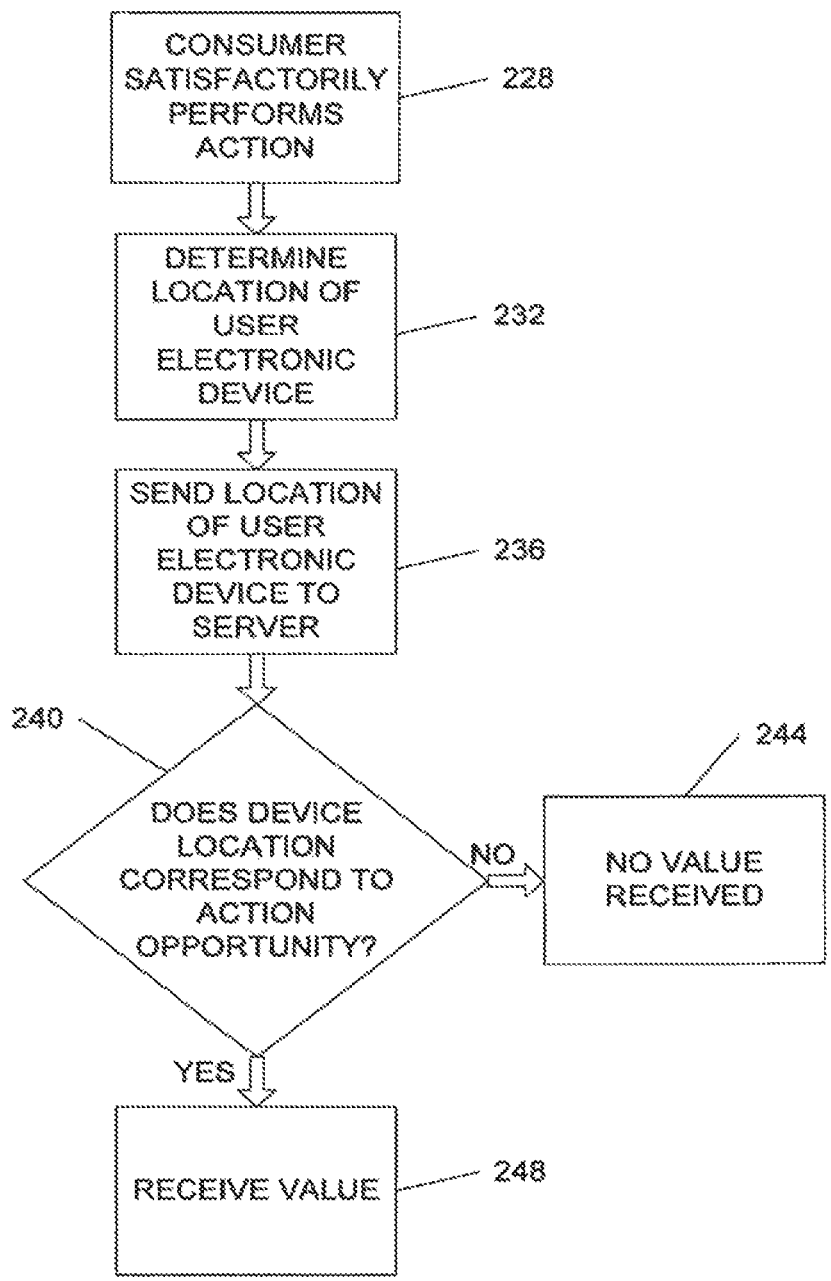
FIG. 10 is a flowchart of an example process of verifying user activity.

With reference to FIG. 10, an example manner of verifying authentic activity, which is generally represented as step 80 in FIG. 2, is illustrated. The following steps for action verification are only example steps presented in an example order, and a variety of other steps, orders, and manners for action verification are possible and are intended to be within the spirit and scope of the disclosed example embodiments. In this example embodiment, the system verifies authentic activity after a user satisfactorily performs an action 228 (also see step 136 in FIG. 4). As a user satisfactorily performs an action, the system identifies the user's location 232 by identifying the location of the user's mobile electronic device. The location of the user's mobile electronic device may be identified in any of the manners described herein or any other possible manner. The identified location of the mobile electronic device is sent to one or more servers via one or more networks 236. The one or more servers determine if the location of the mobile electronic device corresponds to the selected action 240. One example where the location of the mobile electronic device may correspond to the selected action is if the selected action relates to a user venue and the mobile electronic device is identified to be in or near the particular user venue. If the location of the mobile electronic device does not correspond to the selected action, the user does not receive value 244. If the location of the mobile electronic device corresponds to the selected action, the user receives value 248.

Step 248 in FIG. 10 pertaining to the user receiving value may correspond to the step 136 in FIG. 4 of the user receiving value. Example verification of user activity as it relates to FIG. 10 will be described herein for illustrative purposes and is not intended to be limiting upon the disclosed example embodiments. For example, if a user satisfactorily performs an action such as, for example, scanning or purchasing a particular brand of ice cream at a grocery store, the system determines the user's location to ensure that the user is actually at the grocery store. If the user is not at the grocery store corresponding to the ice cream just scanned or purchased, then the user does not receive value. If the user is located at the grocery store where the ice cream was just scanned or purchased, then the user receives value. This type of verification may be used to verify scans or purchases originating at the actual location. Mobile electronic devices may be fraudulently manipulated to create fraudulent scans or purchases in an effort to receive undeserved value. Such fraudulent scans or purchases may be generated from a location other than at the actual location (e.g., grocery store). The present verification activity will identify that the mobile electronic device is not at the actual location (e.g., grocery store) and will know that the scan or purchase is fraudulent.

As indicated above, the examples provided herein for verifying authentic activity are only example and many other examples of verifying authentic activity are intended to be within the spirit and scope of the disclosed example embodiments. For example, the steps provided in the example illustrated in FIG. 10 may be performed in a different order. One such example is illustrated in FIG. 10A.

Figure 10A:
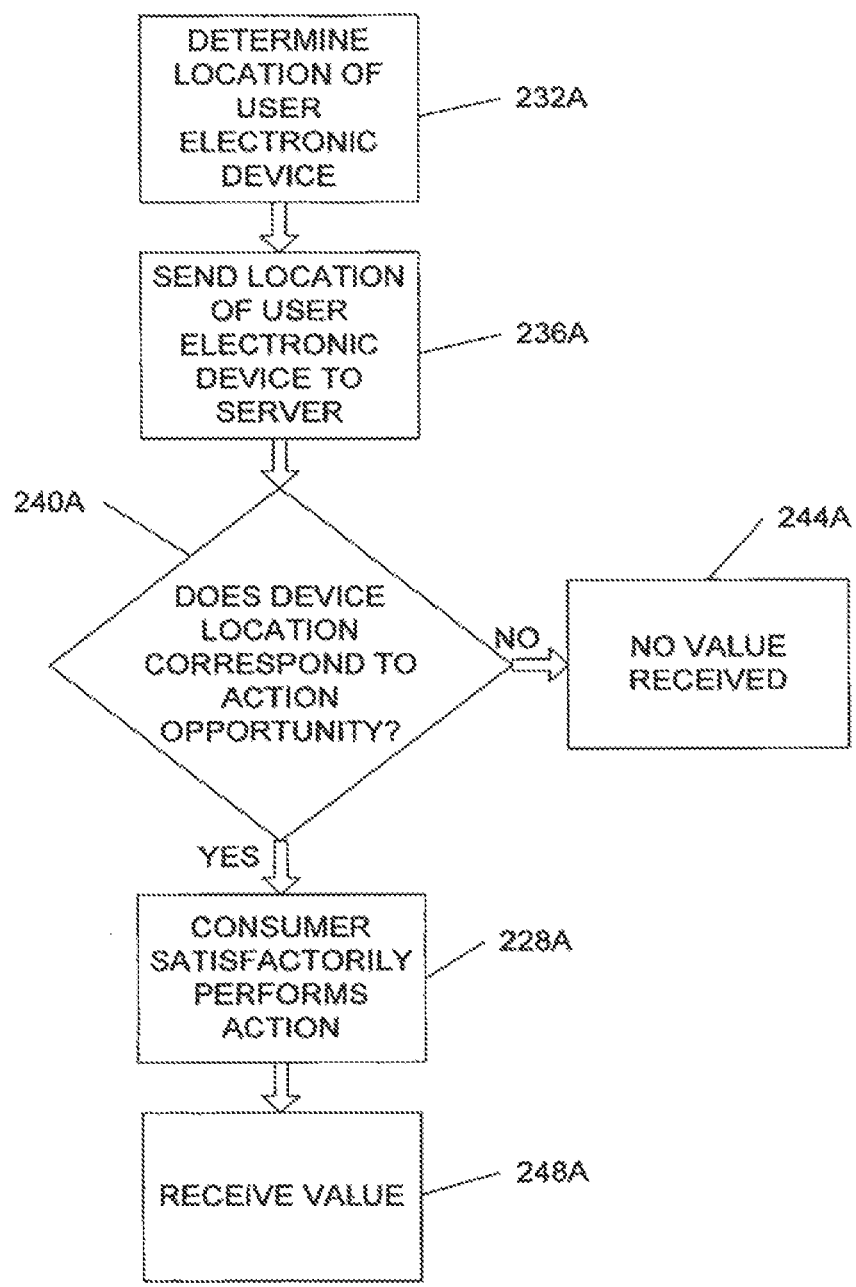
FIG. 10A is a flowchart of another example process of verifying user activity.

In the illustrated example embodiment of FIG. 10A, another example manner of verifying authentic activity, which is generally represented as step 80 in FIG. 2, is illustrated. The following steps for action verification are only example steps presented in an example order, and a variety of other steps, orders, and manners for action verification are possible and are intended to be within the spirit and scope of the disclosed example embodiments. In this example embodiment, the system verifies authentic activity by identifying the user's location 232A by identifying the location of the user's mobile electronic device. The location of the user's mobile electronic device may be identified in any of the manners described herein or any other possible manner. The identified location of the mobile electronic device is sent to one or more servers via one or more networks 236A. The one or more servers determine if the location of the mobile electronic device corresponds to the selected action 240A. One example where the location of the mobile electronic device may correspond to the selected action is if the selected action relates to a user venue and the mobile electronic device is identified to be in or near the particular user venue. If the location of the mobile electronic device does not correspond to the selected action, the user does not receive value 244A. If the location of the mobile electronic device corresponds to the selected action, a user may satisfactorily perform an action 228A (also see step 136 in FIG. 4). As a user satisfactorily performs an action, the user receives value 248A. Step 248A in FIG. 10A pertaining to the user receiving value may correspond to the step 136 in FIG. 4 of the user receiving value.

Example verification of user activity as it relates to FIG. 10A will be described herein for illustrative purposes and is not intended to be limiting upon the disclosed example embodiments. The present example will utilize a grocery store environment. For example, the system determines the user's location to ensure that the user is actually at the grocery store. If the user is not at the grocery store corresponding to a particular brand of ice cream that is associated with the action, then the user does not receive value. If the user is located at the grocery store where the ice cream associated with the action is located, then the user needs to satisfactorily perform the action associated with the ice cream, which may include, for example, scanning or purchasing the particular brand of ice cream at a grocery store. If the user satisfactorily scans or purchases the ice cream, the user receives value. This type of verification may be used to verify scans or purchases originating at the actual location. Mobile electronic devices may be fraudulently manipulated to create fraudulent scans or purchases in an effort to receive undeserved value. Such fraudulent scans or purchases may be generated from a location other than at the actual location (e.g., grocery store). The present verification activity will identify that the mobile electronic device is not at the actual location (e.g., grocery store) and will know that the scan or purchase is fraudulent.

Figure 11:
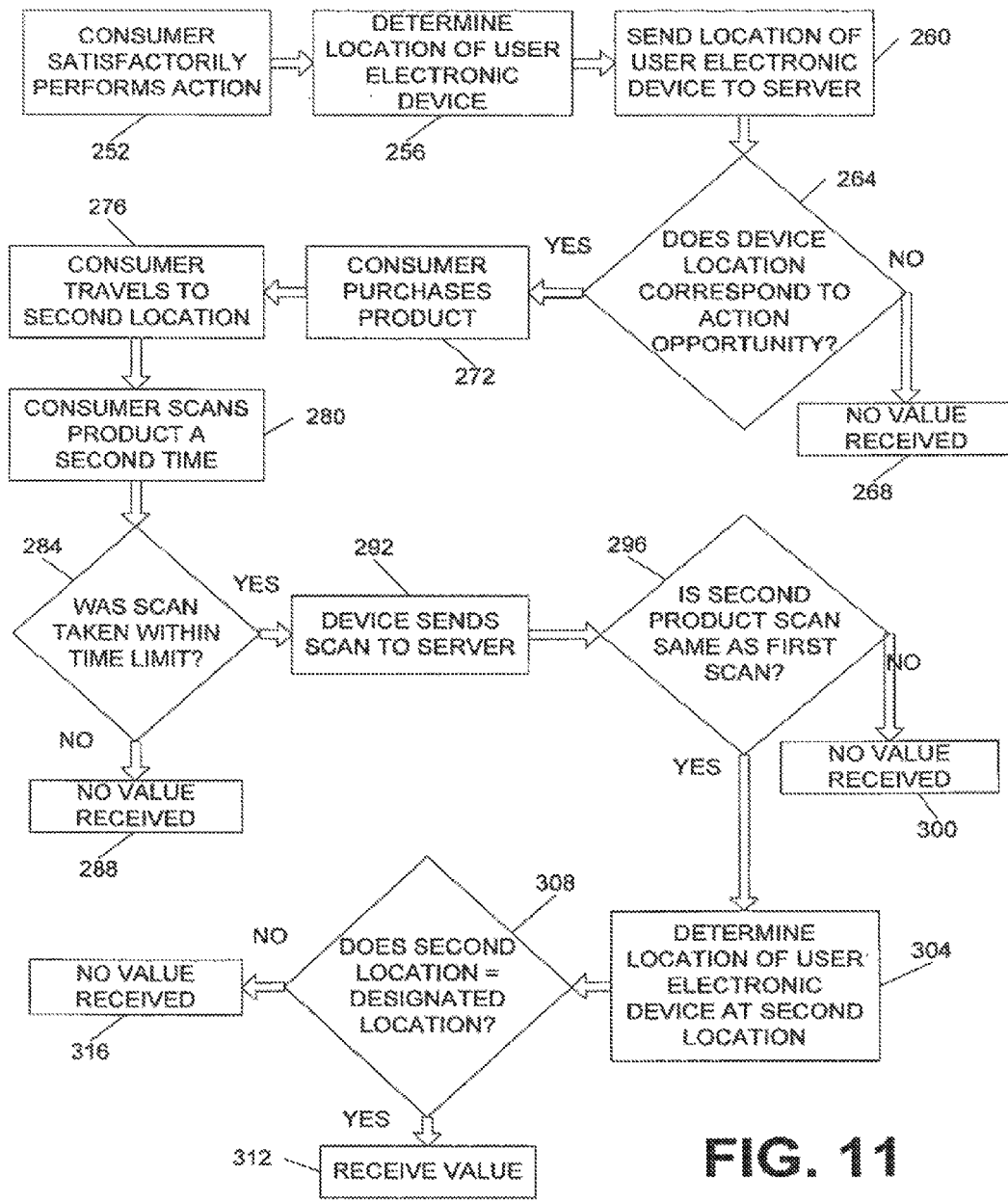
FIG. 11 is a flowchart of yet another example process of verifying user activity.

With reference to FIG. 11, another example manner of verifying authentic activity, which is generally represented as step 80 in FIG. 2, is illustrated. The following steps for action verification are only example steps presented in an example order, and a variety of other steps, orders, and manners for action verification are possible and are intended to be within the spirit and scope of the disclosed example embodiments. In this example embodiment, the system verifies authentic activity after a user satisfactorily performs an action 252 (also see step 132 in FIG. 4). After a user satisfactorily performs an action, the system identifies the user's location 256 by identifying the location of the user's mobile electronic device. The location of the user's mobile electronic device may be identified in any of the manners described herein or any other possible manner. The identified location of the mobile electronic device is sent to one or more servers via one or more networks 260. The one or more servers determine if the location of the mobile electronic device corresponds to the selected action 264. One example where the location of the mobile electronic device may correspond to the selected action is if the selected action relates to a user venue and the mobile electronic device is identified to be in or near the particular user venue. If the location of the mobile electronic device does not correspond to the selected action, the user does not receive value 268. If the location of the mobile electronic device corresponds to the selected action, the user may be required to purchase a product corresponding to the selected action 272. One example where a purchased product corresponds to a selected action may occur in a user venue such as a grocery store. In such an example, the selected action may relate to a particular product in the grocery store and the user must purchase the particular product from the grocery store in order to eventually receive value.

With continued reference to FIG. 11, a user travels to a second location 276 such as, for example, the user's home, after purchasing the product. At the second location, the user takes a picture or scans the purchased product 280. For this example, the user's picture or scan at the second location may be a second picture or scan of the product. As part of satisfactorily performing an action (see step 252 and step 132 in FIG. 4), the user may have been required to take a first picture or scan of the product (see step 220 in FIG. 9). Thus, the picture or scan of the product occurring at step 280 in FIG. 11 may be a second picture or scan of the product. After the second picture or scan occurs, the system may determine if the second picture or scan occurred within a designated time limit 284. The time limit may be any quantity of time and be within the intended spirit and scope of the disclosed example embodiments. Example time limits may include, but are not limited to, 30 minutes, 1 hour, 2 hours, etc. If the second picture or scan does not occur within the time limit, the user may not receive value 288. If the second picture or scan occurs within the time limit, the mobile electronic device sends the second picture/scan to the one or more servers via one or more networks 292. The one or more servers then determine if the second picture/scan is taken of the same product from which the first picture or scan was taken 296. If the second picture/scan is not of the same product, then the user does not receive value 300. If the second picture/scan is of the same product, then the system identifies the location of the mobile electronic device at the second location 304. The location of the mobile electronic device may be determined in any of the manners described herein or any other manners and be within the intended spirit and scope of the disclosed example embodiments. An additional example manner of determining the second location of the mobile electronic device may include a second verification element at the second location. The second verification element can identify the second location of the electronic mobile device in similar manners to that described herein in connection with the first verification element. Continuing, the system then determines if the location of the mobile electronic device at the second location is the same as the predetermined designated location 308. As indicated above, for example, the designated location could be the user's home. A user's home may be verified in a variety of manners including, for example, from information provided by the user upon account activation, professional or certified installation of the second verification element discussed above, credit card billing address, US mailing address, frequently visited GPS coordinates, or any other manner. If the second location of the mobile electronic device is at the designated location, then the user receives value 312. If the second location of the mobile electronic device is not at the designated location, the user does not receive value 316~Step 312 in FIG. 11 pertaining to the user receiving value may correspond to the step 136 in FIG. 4 of the user receiving value.

It may also be desirable to verify the authenticity of the scan taken by the camera of the mobile electronic device. Fraudulent scans may be an artificially generated barcode, picture of a product barcode instead of the actual barcode on the product, or other fraudulent manners attempting to receive undeserved value from fraudulent activity. Authenticity of the scan may be verified in a variety of different manners. The following example embodiments are provided for illustrative and example purposes, and are not intended to be limiting. Other example embodiments of authenticating scans taken by a mobile electronic device are possible and are intended to be within the spirit and scope of the disclosed example embodiments.

With respect to the example embodiment illustrated in FIG. 11, multiple scans may require authentication. It should be understood that the verification of the authenticity of scans of the disclosed example embodiments may be performed in connection with any scan taken with a camera of a mobile electronic device. However, for illustrative and example purposes, the following example embodiments of scan verification relate to the example embodiment illustrated in FIG. 11.

In one example embodiment, the authenticity of a scan may be performed manually. In such an embodiment, step 292, as well as any other scanning or picture taking step, may be replaced or followed by a step of an individual visually inspecting the second scan. If the individual believes the second scan is authentic, the individual will then determine if the second scan is taken of the same product from which the first scan is taken. This manual determination occurs at query step 296 in FIG. 11. After this manual verification at step 296, the process continues as illustrated in FIG. 11. Alternatively, manual verification may occur after value is credited or it may occur at certain value thresholds to target certain behavioral patterns of users.

In another example embodiment, the authenticity of a scan may be performed automatically by a computer system without manual interaction. For example, such a computer system may include network, servers, storage media with databases of scanned pictures, CPU, memory, temporary drive, or memory for performing image comparisons. In such an example embodiment, step 292, as well as any other scanning or picture taking step, may be replaced by or followed by a step of automated image duplication detection. This detection discovers if one or more users are submitting similar scans of a picture of a product or a generated barcode rather than an actual product barcode. Methods of verifying authenticity include ensuring uniqueness by comparing the entire image to scans of the same product submitted by the same and/or other users to detecting identical shading and lighting (this will occur if a user is scanning the same photograph of a barcode that he or another user submitted). Uniqueness may also be confirmed by comparing scans of the same product submitted by the same and/or other users by examining portions of the image in the background outside of the barcode. This method will detect if multiple scans of the same photograph of a barcode are submitted. To increase the possibility that portions of the background are included in the image taken by the camera of the mobile electronic device, the display or screen of the mobile electronic device seen by the user shows less than the full image that will be captured by the camera when the camera takes the image. For example, the image displayed on the screen of the mobile electronic device will be smaller than the actual size of the image captured by the camera. That way, the user will be unaware that more images will be captured then he/she expects. Yet another method for verifying the authenticity of a scan may include comparing the scan to one or more known verified versions of the product. This will confirm that the barcode is not artificially generated via a fraudulent method such as reproducing a barcode via a printer, electronic monitor, etc. Since the scans of true products will appear similar because packages are the same, artificially created barcodes will not match the actual product. Artificially created barcodes may be of the wrong color, and/or include pixilation, may not include background images from packaging, etc. Thus, this method will find scans that are not of the actual product. Using these methods of verifying similarity to actual products and/or dissimilarity to previously submitted scans, automated methods can rate the fraudulent likelihood of a given scan. To make an actual comparison, the one or more servers may divide up an image into a set of many smaller images and compare similarity of the entire image, a subset of only the barcode portion, or a subset excluding the barcode portion.

Example verification of user activity as it relates to FIG. 11 will be described herein for illustrative purposes and is not intended to be limiting upon the disclosed example embodiments. For example, a user may have an action involving traveling to a grocery store and purchasing a particular brand of shampoo. By traveling to the grocery store and purchasing the shampoo, the user satisfactorily performs the action. Next, the system determines if the user is actually at the grocery store and has purchased the shampoo. Verification of the user's location is performed to determine that the user is at the grocery store and the user may scan the particular shampoo to confirm an interaction and begin confirming purchase of the shampoo. If the user is not at the grocery store or has not scanned the particular shampoo, the user does not receive value. After purchasing the particular shampoo, the user travels to a designated second location such as, for example, his/her home, to unload the shampoo along with any other purchased products. In some instances, it may be desirable to disqualify particular locations as appropriate designated second location. For example, the system may disqualify locations within a particular radius of the venue from which the product was purchased or may disqualify locations within a particular radius of venues offering the same product. Returning to the illustrated example embodiment, the user may take a second scan of the shampoo at the designated second location. If the user does not take the second scan within a particular time limit such as, for example, 1 hour, the user does not receive value. If the user performs the second scan within 1 hour, the mobile electronic device sends the second scan of the shampoo to one or more servers. The system determines if the second scan of the shampoo is of the same bottle of shampoo from which the first scan was taken. If the scans are not of the same bottle of shampoo, the user does not receive value. If the scans are of the same bottle of shampoo, the location of the user is determined by determining the location of the user's mobile electronic device. If the user is in fact at his/her designated second location, the user receives value. If the user is not at his/her designated second location, the user does not receive value. If the designated second location is a user's home, verification of the user's home may occur by comparison with a credit card address, US mail address, a post card send to the user's home, any other home and address verification manner described herein, or other types of home and address verification manners not explicitly disclosed herein, but intended to be within the intended spirit and scope of the disclosed example embodiments.

Figure 11A:
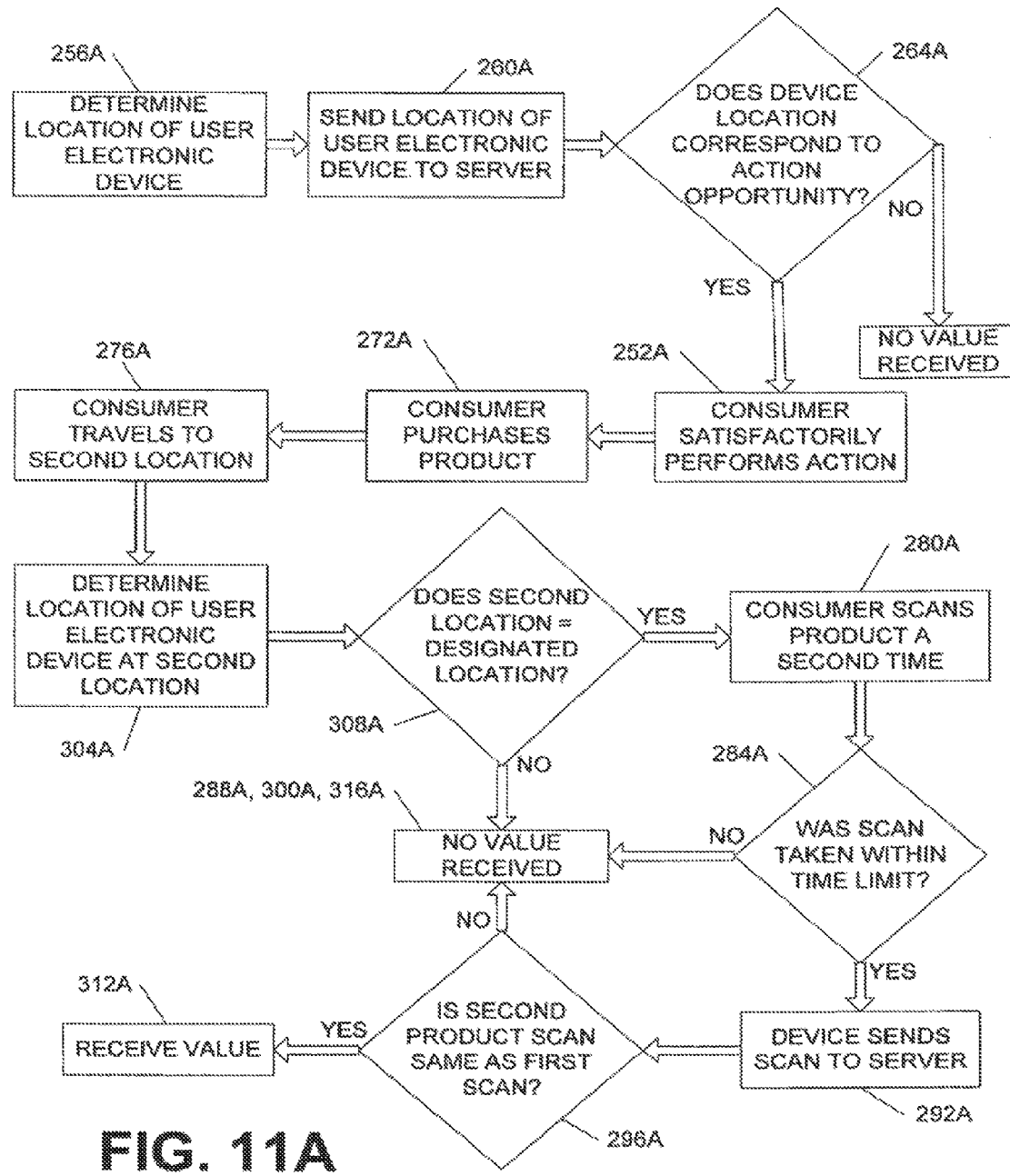
FIG. 11A is a flowchart of a further example process of verifying user activity.

As indicated above, the examples provided herein for verifying authentic activity are only example and many other examples of verifying authentic activity are intended to be within the spirit and scope of the disclosed example embodiments. For example, the steps provided in the example illustrated in FIG. 11 may be performed in a different order. For example, with reference to FIG. 11A, the user's satisfactory performance of an action 252A may be performed after the mobile electronic device's location is determined to correspond to the action opportunity (i.e., step 252A may be performed between step 264A and step 272A). Also, for example, the location of the user may be determined 304A and compared to the designated location 308A at various times in the process. One example illustrated in FIG. 11A establishes that the location of the user may be determined 304A and compared to the designated location 308A after the user travels to the second location 276A and prior to scanning the product a second time 280A. These examples are only a few examples of the many possibilities for alternative step orders and the illustrated and described process steps are not intended to be limiting upon the disclosed example embodiments. Rather, the steps may occur in any order and additional or less steps may be included in the process.

Figure 12:
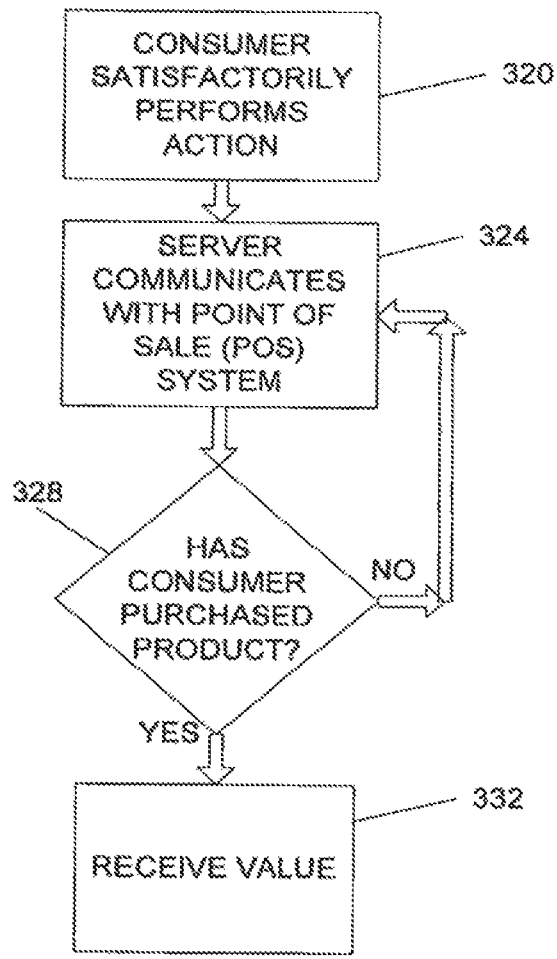
FIG. 12 is a flowchart of still another example process of verifying user activity.

With reference to FIG. 12, yet another example manner of verifying authentic activity, which is generally represented as step 80 in FIG. 2, is illustrated. The following steps for action verification are only example steps presented in an example order, and a variety of other steps, orders, and manners for action verification are possible and are intended to be within the spirit and scope of the disclosed example embodiments. In this example embodiment, the system verifies authentic activity after a user satisfactorily performs an action 320 (also see step 132 in FIG. 4). After a user satisfactorily performs an action, one or more servers communicate with a point of sale (POS) system associated with the user activity via one or more networks 324. The POS system may be any of a variety of different POS systems including, but not limited to, a cash register, payment processing system or pin pad, self-checkout system, loyalty program system, near field communication system, transaction confirmation screen, etc. In one example, the user activity may relate to a user venue and the POS system may be incorporated with the user venue to track user activity such as, for example, product purchases within the user venue. In this example, the one or more servers communicate with the POS system to determine if the user made a purchase associated with the action 328. If the user did not make a purchase associated with the action, the system may continuously or intermittently recheck to determine if the user has made the purchase. If the user makes the purchase, the user receives value 332. Step 332 in FIG. 12 pertaining to the user receiving value may correspond to the step 136 in FIG. 4 of the user receiving value.

Example verification of user activity as it relates to FIG. 12 will be described herein for illustrative purposes and is not intended to be limiting upon the disclosed example embodiments. For example, an action may require a user to travel to a grocery store and the user satisfactorily performs that action by traveling to the grocery store. To receive value, the user may also be required to purchase a particular product at the grocery store. When, the system identifies that the user is at the grocery store, it communicates with a POS system of the grocery store to determine if the user has purchased the particular product. If the POS system has not yet indicated that the user has purchased the particular product, the system and the POS system may periodically communicate to determine if the user has purchased the particular product. If the user purchases the particular product, the POS system and the system communicate to verify the user's purchase of the particular product and the user receives value.

Figure 13:
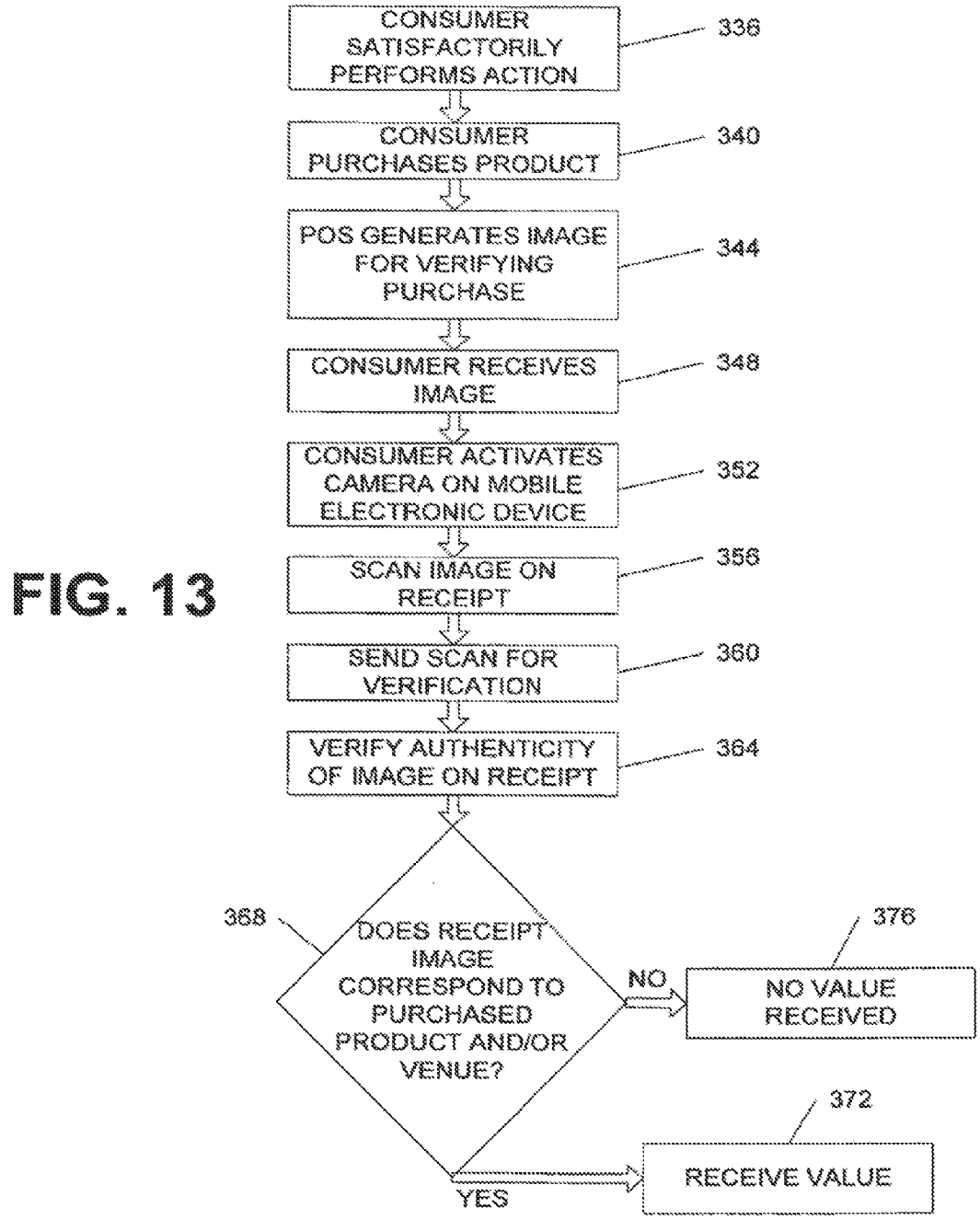
FIG. 13 is a flowchart of a further example process of verifying user activity.

Referring now to FIG. 13, a further example manner of verifying authentic activity, which is generally represented as step 80 in FIG. 2, is illustrated. The following steps for action verification are only example steps presented in an example order, and a variety of other steps, orders, and manners for action verification are possible and are intended to be within the spirit and scope of the disclosed example embodiments. In this example embodiment, the system verifies authentic activity after a user satisfactorily performs an action 336 (also see step 132 in FIG. 4). After a user satisfactorily performs an action, the user may decide to purchase a product associated with the satisfactorily performed action 340. Upon purchasing a product, a point of sale (POS) system associated with the venue from which the product was purchased generates an image 344. In some example embodiments, the image may be preprinted on the receipt paper and such preprinted receipt paper may be provided to the venue in the form of a triggered coupon, an image on the user POS terminal, etc. The venue then loads the registers with the preprinted receipt paper and prints relevant information on the receipt paper as users purchase products. In other example embodiments, the image is not preprinted on the receipt paper and is instead printed on the receipt paper as the receipt is being generated for the user's purchase. In this embodiment, the POS system prints an image on the receipt paper during generation of the receipt for the user.

The image may be a wide variety of types of images. For example, the image may be a barcode, a code consisting of letters, numbers, and/or characters, an image of a product (either the product being purchased or some other product), an image associated with the venue (e.g., a trademark associated with the venue, abbreviation or acronym of the venue, etc.), a QR code, or two-dimensional barcode, or any other type of image.

After receipt generation, the user receives the image 348. The user activates his/her camera 352 on the mobile electronic device and performs a scan of the image on the receipt with the camera 356. Then, the mobile electronic device sends the scan of the receipt image 360 to one or more servers via one or more networks for verification 364. The authenticity of the receipt image may be verified in any of the manners described herein such as, for example, manually, automatically, etc., or any other manner, all of which are intended to be within the spirit and scope of the disclosed example embodiments. This verification step attempts to determine if the receipt image corresponds to the purchased product and/or the venue of purchase 368. If the receipt image corresponds to the purchased product and/or venue, the user receives value 372. If the receipt image does not correspond to the purchased product and/or the venue, the user does not receive value 376. Step 372 in FIG. 13 pertaining to the user receiving value may correspond to the step 136 in FIG. 4 of the user receiving value. Example verification of user activity as it relates to FIG. 13 will be described herein for illustrative purposes and is not intended to be limiting upon the disclosed example embodiments. The example used above to illustrate FIG. 12 will be relied upon herein with reference to FIG. 13 at least in connection with the similar elements between the two flowcharts. For example, an action may require a user to travel to a coffee shop and the user satisfactorily performs that action by traveling to the coffee shop. To receive value, the user may also be required to purchase a particular coffee drink. Upon the user purchasing the particular coffee drink, the POS system of the coffee shop generates a receipt for the user's purchase of the particular coffee drink. An image such as, for example, a barcode is included on the receipt. After the user receives the receipt, the user activates the camera on his/her mobile electronic device and performs a scan of the barcode on the receipt. The user then sends the scan of the barcode for verification. The system verifies authenticity of the barcode by determining if the barcode corresponds to the particular coffee drink and/or the coffee shop. If the barcode in the scan does not correspond to the particular coffee drink and/or the coffee shop, the user does not receive value. On the other hand, if the barcode in the scan does correspond to the particular coffee drink and/or the coffee shop, the user receives value.

Now that numerous examples of action generation and action verification have been described, at least one example of value redemption will be described herein. The example value redemption described herein is not intended to be limiting. Many other manners of value redemption may be performed and are intended to be within the spirit and scope of the disclosed example embodiments.

Figure 14:
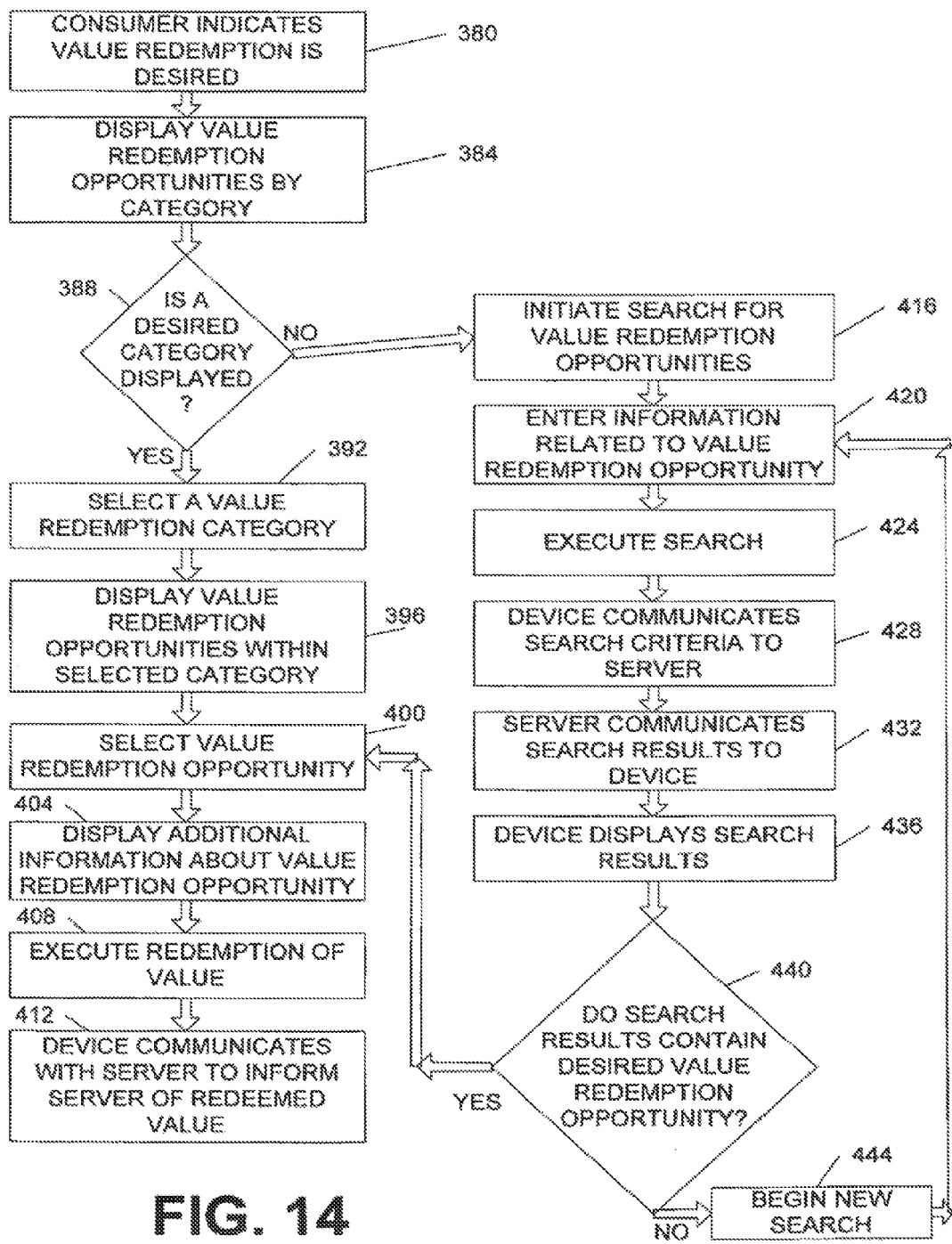
FIG. 14 is a flowchart of an example process of value redemption.

As shown in FIG. 2, a general representation of value redemption is illustrated at step 84. Referring now to FIG. 14, an example manner of value redemption is illustrated in more detail. Initially, the user indicates that value redemption is desired 380. The user may accomplish this by selecting, on the mobile electronic device, that value redemption is desired. The mobile electronic device then communicates with one or more servers via one or more networks to indicate the user's desire to redeem value. The one or more servers then send appropriate data back to the mobile electronic device relating to value redemption. The mobile electronic device then displays one or more value redemption opportunities by category 384. The user then determines if a desired category is displayed 388. If a desired category of value redemption is displayed, the user selects the desired value redemption category 392. After selection of a category, one or more specific value redemption opportunities within the category are displayed on the mobile electronic device 396. The user selects one of the value redemption opportunities 400 and the mobile electronic device may display additional information relating to the selected redemption opportunity 404. After displaying the additional information, the user executes redemption of the value 408. The mobile electronic device communicates with the one or more servers via the one or more networks to indicate the redemption of value performed by the user 412. It should be understood that the user may redeem value on user electronic devices other than mobile electronic devices such as, for example, personal computers, laptops, or any other electronic device capable of communicating with the one or more servers via one or more networks.

Returning to step 388, if the user does not see a desired redemption opportunity displayed on the mobile electronic device, the user may initiate a search for value redemption opportunities 416. In the alternative, the user may desire to perform a search for value redemption opportunities at the onset of attempting to redeem value. Such an alternative may be desirable if the user does not want to look through the full list of redemption opportunities. After initiation of the search, the user enters information into the mobile electronic device related to a desired redemption opportunity 420. The user then executes the search 424 with the mobile electronic device after entering desired information. The mobile electronic device communicates the entered search criteria to one or more servers via one or more networks 428. The one or more servers communicate search results related to the search criteria to the mobile electronic device via one or more networks 432. The mobile electronic device then displays the search results for viewing by the user 436. Next, the user determines if a desired value redemption opportunity is displayed 440. If not, a new search may be initiated 444. If a desired value redemption opportunity is displayed, the user selects the desired redemption opportunity as illustrated at step 400 in FIG. 14. Then, steps 404-412 are followed in a similar manner to that described above.

An example of value redemption as it relates to FIG. 14 will be described herein for illustrative purposes and is not intended to be limiting upon the disclosed example embodiments. As an example, the user has accrued sufficient reward points from satisfactorily performing various user activities and wishes to redeem at least a portion of the reward points for a product or service. The user begins by indicating on his/her mobile electronic device that he/she desires to redeem points. The user's mobile electronic device displays redemption opportunities by category such as, for example, gift cards, gadgets, e-delivery, charity, coupons, etc. For purposes of this example, we will assume the user desires to redeem points for a gift card. The user sees the gift card category displayed on the mobile electronic device and selects the gift card category. Next, the mobile electronic device displays more specific gift card redemption opportunities. The user selects one of the gift card redemption opportunities and, if necessary, the mobile electronic device displays additional information about the selected gift card redemption opportunity such as, for example, an expiration date, use and location restrictions, etc. The user executes the redemption reward points for the gift card via the mobile electronic device, which then communicates the redemption to the one or more servers via the one or more networks. Returning to the point in this example where the categories of redemption opportunities are displayed on the mobile electronic device, if the user does not see a desired category or does not want to survey the entire list of categories, the user may initiate a search for a particular type of redemption category. For purposes of this example, let's assume the user wants to redeem reward points for a digital music player. The user enters the words "digital music player" into the mobile electronic device and the user executes the search. The mobile electronic device sends the search criteria to the one or more servers, which return the search results to the mobile electronic device pertaining to "digital music player". The mobile electronic device displays the search results relating to digital music players. If the displayed search results are not satisfactory to the user, he/she can initiate a new search. If the search results contain a desirable digital music player, the user selects the desired digital music player, executes the redemption of reward points, and the redemption of points for the digital music player is complete.

The system is capable of having real-time or substantially real-time operation and non-real-time operation. Real-time or substantially real-time operation may occur when the user electronic device is capable of communicating with one or more networks and the one or more networks are continuously or substantially continuously available. With these capabilities, the system is capable of performing necessary steps and actions as such steps and actions are required. The system may operate in a non-real-time manner for a variety of reasons. Some example reasons include, but are not limited to, when one or more networks are not available (e.g., no internet access, poor or no cellular coverage, etc.), when the user electronic device is capable of communicating with only a particular type of network (e.g., iPod Touch™ is not cellular capable and is only internet capable) and such particular type of network is not available (e.g., internet not available), or a variety of other reasons.

In instances where non-real time operation is necessary, the system stores or caches data to allow the user to utilize his/her mobile electronic device to receive value associated with the present system. The system is capable of storing or caching data in a variety of different manners and the following described manners are only example manners of storing or caching data.

While not explicitly described herein, the system is capable of performing other manners of storing or caching data and such other manners are intended to be within the spirit and scope of the disclosed example embodiments.

For example, an instance may arise where the user is in an area having poor or no cellular coverage and no WI-FI or WLAN availability. In such an instance, the user's mobile electronic device may not communicate with one or more servers via one or more networks. However, the user may be in a location where an action may be performed to receive value.

Figure 17:
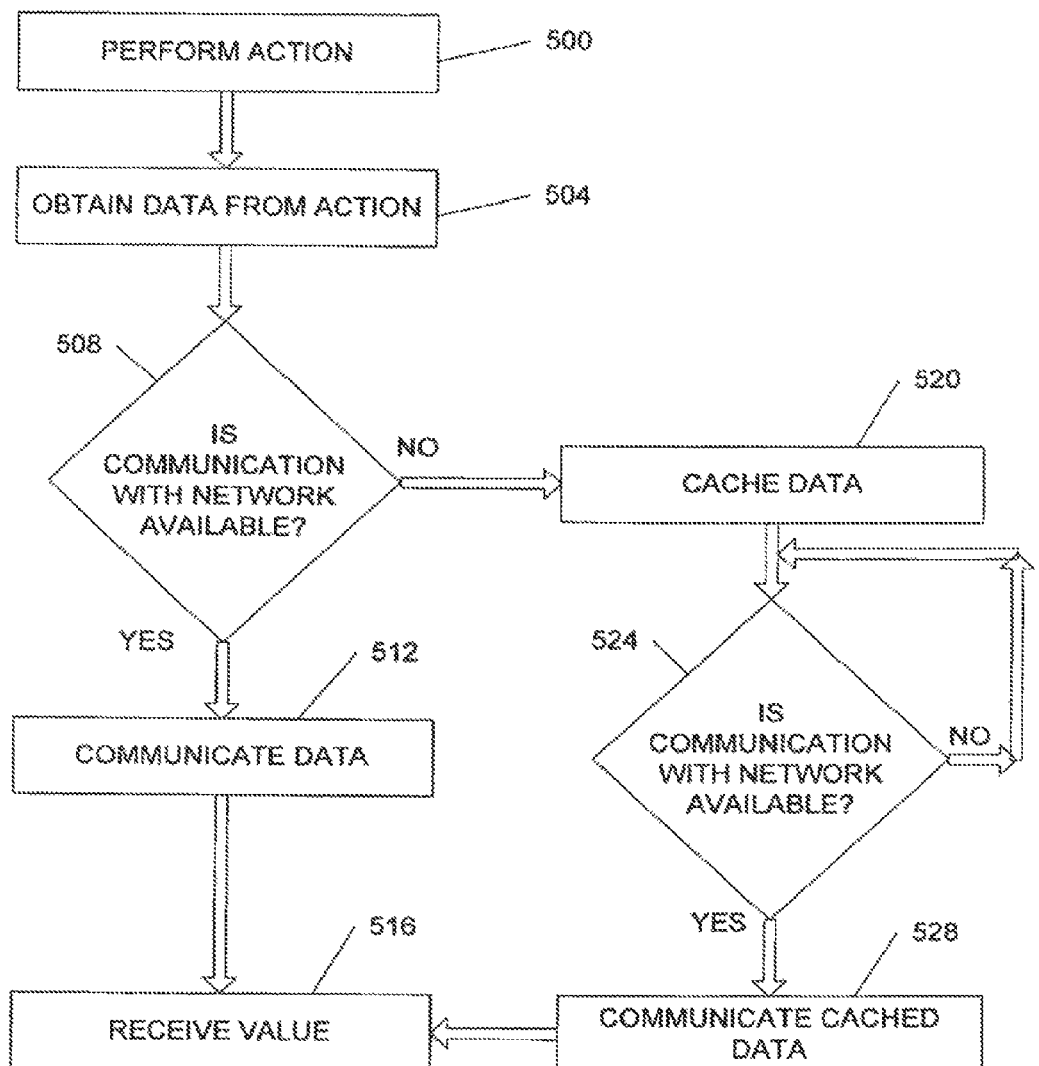
FIG. 17 is a flowchart of an example process of enabling a user to receive value when the user's mobile electronic device lacks communication with one or more networks.

With reference to FIG. 17, an example manner of enabling a user to obtain value when in a location lacking communication with one or more networks is illustrated. The following steps are only example steps presented in an example order, and a variety of other steps, orders, and manners for enabling a user to obtain value when in a location lacking communication with one or more networks are possible and are intended to be within the spirit and scope of the disclosed example embodiments. In this example embodiment, an action is performed 500 such as, for example, mobile electronic device communication with a verification element, user satisfactorily performs an action, etc. Data is obtained as a result of the action 504.

Communication between the mobile electronic device and one or more networks needs to be determined 508. If the mobile electronic device is in a location with access to one or more networks, the data associated with the action is communicated via one or more networks 512. Subsequently, the user receives value 516. If the mobile electronic device is in a location without access to one or more networks, the data is stored or cached in the mobile electronic device 520. The mobile electronic device may check for the availability of one or more networks on a periodic or continuous basis 524. When one or more networks become available, the mobile electronic device communicates the stored or cached data via the one or more available networks 528. Subsequently, the user receives value 516.

A real-world example of enabling a user to obtain value when in a location lacking communication with one or more networks will be described herein for illustrative purposes and is not intended to be limiting upon the disclosed example embodiments. The present example will utilize a grocery store environment and a user attempting to scan a particular product to receive value.

Before the user enters the grocery store, the mobile electronic device may communicate with a verification element and the mobile electronic device may store or cache data in its memory associated with the verification element for use when a network is not available. The user may then proceed to an aisle in a store with a network not available, view stored or cached opportunities, and scan the barcode of a particular item. The mobile electronic device may store or cache transmission data associated with the scanned item when a network is not available. The user may then decide to purchase the scanned item and leaves the grocery store. As the user travels home, the user may drive into an area having good cellular coverage. After entering the good cellular coverage area, the mobile electronic device communicates the stored or cached data associated with the verification element and the stored or cached data associated with the scanned item to the one or more servers via the now available cellular network. Upon the one or more servers' receipt and verification of the stored or cached data, the user receives the deserved value. Had the mobile electronic device not stored or cached data of the opportunities available and/or the user action when it was out of communication with one or more networks, the user would not have received value obtained during the period of non-communication.

As another example, the user may have a mobile electronic device that is only WIFI internet capable and is not cellular capable (e.g., tablet computer, iPod Touch™, etc.). In such an instance, the user may have internet access at home, but may not have internet access away from his/her home. When the user is at home, the mobile electronic device may store or cache data or preload data into its memory associated with actions and value receiving opportunities within a particular area. Such a particular area may be, for example, a particular radius from the user's home, a particular city, county, state, nation, or any other area. In the present example, the predetermined area will be a 50 mile radius from the user's home. Thus, the system stores or caches data associated with all the actions and value receiving opportunities within the 50 mile radius of the user's home. When the user leaves his/her home and travels within the 50 mile radius, the various actions and value receiving opportunities are displayed on the user's mobile electronic device. The user may desire to perform an action and a value receiving opportunity within the 50 mile radius. For example purposes, assume the user is in a grocery store within the 50 mile radius and the user wants to scan a particular product to receive value. When the user enters the grocery store, the mobile electronic device may communicate with a verification element and the mobile electronic device may store or cache data in its memory associated with the verification element. The user may then proceed to a particle aisle and scan the barcode of a particular item. The mobile electronic device may store or cache data associated with the scanned item. The user may then decide to purchase the scanned item and leaves the grocery store for home. As the user arrives at his/her home, the user enters into his/her WI-FI, WLAN, or other network range. After entering the user's network range, the mobile electronic device communicates the stored or cached data associated with the verification element and the stored or cached data associated with the scanned item to the one or more servers via the now available home network. Upon the one or more servers' receipt and verification of the stored or cached data, the user receives the deserved value. Had data not been stored or cached or preloaded into the mobile electronic device when the mobile electronic device was in communication with the internet and had the mobile electronic device not stored or cached data when it was out of communication with the internet, the user would not have received value for his/her activities performed out of communication with the internet.

Figure 18:
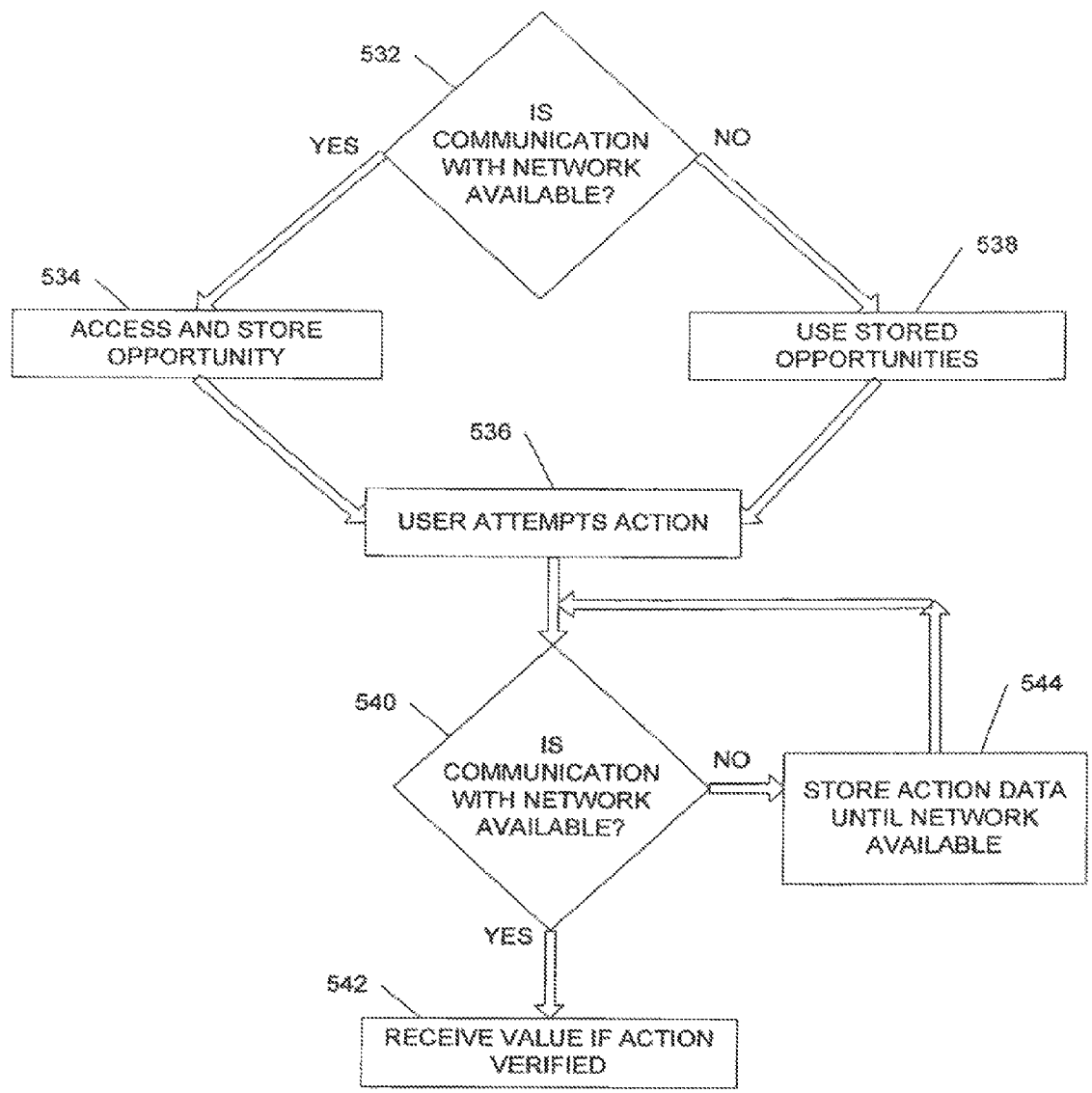
FIG. 18 is a flowchart of another example process of enabling a user to receive value when the user's mobile electronic device lacks communication with one or more networks.

As users move from place to place, the mobile electronic device will gain and loose access to networks. The disclosed example embodiments accommodate such gain and loss of networks and still facilitates proper functionality. With reference to FIG. 18, another example manner of enabling a user to obtain value 'when access to one or more networks is unavailable is illustrated. The illustrated example embodiment is only one of many different manners of enabling a user to obtain value when access to one or more networks is unavailable and all of such manners are intended to be within the spirit and scope of the disclosed example embodiments. Initially, the mobile electronic device determines if one or more networks is available 532. If a network is available, the mobile electronic device accesses a server via the accessible network and stores opportunities in the storage device of the mobile electronic device 534. At some point after the opportunities are stored on the mobile electronic device, a user may attempt an action 536. Returning to step 532, if a network is not available, the mobile electronic device cannot access a server over a network and the mobile electronic device must use one or more of the opportunities previously stored in the storage device of the mobile electronic device 538. Subsequently, a user may attempt one of the previously stored opportunities 536. The mobile electronic device again determines if one or more networks is available 540. If a network is available, the user will receive value if the action is verified 542. If a network is not available, data associated with the action is stored on the mobile electronic device until a network is available 544. When a network becomes available, the data is communicated and the user receives value if the action is verified 542.

Figure 19:
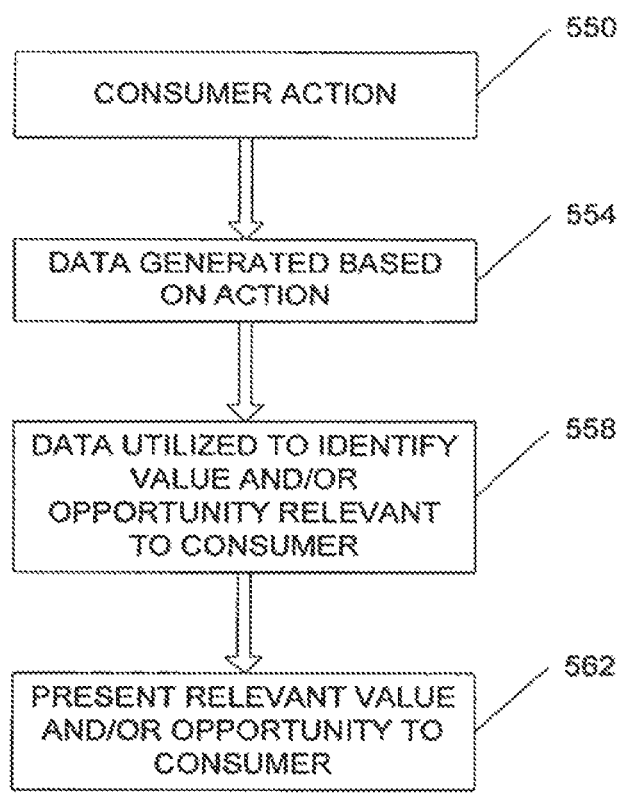
FIG. 19 is a flowchart of an example process of marketing to a user based on the user's own activity.

With reference to FIG. 19, as users perform various activities 550 in commerce, data associated with the users' activities may be generated 554, collected, stored, and utilized for a variety of reasons 558. In some example embodiments, user data may be utilized to effectively market to the user 558. If the user is presented with value and/or opportunities 562 such as, for example, display advertising, videos, coupons, digital coupons, grocery list creation, discounts, highlighted products, special offers, etc., based on the user's own activity, the value and/or opportunities are more likely to be relevant to and desired by the user. In some example embodiments, the system may present value and/or opportunities relating to products the user purchased or products in which the user is otherwise interested. In other example embodiments, the system may present value and/or opportunities similar to or relating to competitors (e.g., having a different brand) of those products the user purchased or is otherwise interested in. In further example embodiments, the system may present value and/or opportunities relating to one or more demographics of a user such as, for example, age, sex, race, household income, geographic location, marital status, with or without children, etc.

An example manner of marketing to a user based on the user's own activity is described herein. The example manner is not intended to be limiting and many other manners of marketing to users based on the users' own activity are intended to be within the spirit and scope of the disclosed example embodiments. In addition, the steps provided in the illustrated example embodiment may occur in a variety of different orders and the illustrated example manner of marketing to a user may include more or fewer steps, all of such possibilities are intended to be within the spirit and scope of the disclosed example embodiments. For example, a user may be presented with an activity to scan specific products or specific categories of products at a designated location such as, for example, the user's home. The user may scan specific products or categories of products for value, which, along with other data, may trigger targeted advertisements, action opportunities, and/or other forms of value. In some instances, it may be desirable for the system to discern a designated location from a nearby store. The system may choose to make ineligible a designated location within a radius of the venue from which products were purchased by the user, or within radii of venues offering the same product. The designated location, if it is a user's home, may be verified in a variety of manners such as, for example, credit card address verification, a postcard send, and/or other address confirmation methods. When a user scans previously purchased products at home, data associated with the scanned products will be stored in a history of that user's purchases along with the time scanned. These purchases made by the user may be combined with database information from POS systems and verified shopping trips to create a more comprehensive buying history. This database may also be combined with demographics of the user. Based on these demographics and/or buying history and/or immediate scans, triggers can be created resulting in customized experiences for particular users. These triggers may result in targeted advertisements, action opportunities, and/or other forms of value that could appear immediately or at a later time such as, for example, when a user enters a location, when the users is in other smartphone Apps on the mobile electronic device, when the user is performing smartphone web browsing on the mobile electronic device, and/or upon scanning a future purchased product. Triggers, by way of example, may include marketing a competing brand of soda to a user that scanned a different brand at home. Another trigger may be identifying a coffee drinker and marketing a new type of instant coffee to the coffee drinker. Another trigger may be identifying a family with baby food in the house and marketing a brand of diaper. Another trigger may include identifying an elderly user via demographics and offering value upon completing a survey on vitamins designed for older individuals. These are only a few of the many possible types of marketing triggers and are provided for example and illustrative purposes only. Any possible triggers are intended to be within the spirit and scope of the disclosed example embodiments.

The many possible manners of marketing to users based on their own activity may allow targeted advertisements to reach a user based on specific demographics, product ownership, and/or location visits. Additionally, these manners of marketing to users do not require, but may work with, connection to a POS system. Users may receive the targeted value, action opportunities, etc., at many times such as, for example, when the user is actively shopping or before a purchase is made. Reaching users prior to purchase may be a more effective manner of marketing than targeting a user post-sale as the users are leaving the store and are less likely to retain any value, coupons, etc. for a return visit.

Users also have opportunities to earn value without making a purchase by, for example, scanning a product, entering a particular location, etc. Engaging a user without requiring a purchase may increase the likelihood that a user will take an action such as, for example, scanning a product, entering a location, etc. Upon finding a product, entering a location, etc., the user is further down the purchasing path and can be marketed again to evaluate the offer and ultimately make a purchase. With this process, the user may be motivated to at least travel to the product or location, collect value, and gain more information about the product's fit for the user. To the contrary, post-purchase targeting such as coupons for random products may be simply and outright dismissed by the user because the user is not interested in the product. The process of target marketing users based on the user's activity facilitates surveying of user activity at critical decision making times in response to triggers.

Further, users may receive value in response to purchase interest or history. Users may interact with products they have purchased within product categories to provide value. Users may also indicate interest in products, services, or stores via clicks or selections on digital coupons, offers, grocery list creation, loyalty card history, specific stores visited, etc. Value received by the user may include triggered value advertising or offers targeted to specific categories of products and/or stores through mobile electronic experiences. Such triggered value may occur immediately after a triggering event or it may occur at a later time. Such triggered value may also occur in another application (App) on the mobile electronic device or on another electronic device in a household. Such value may occur outside of the system or application where the action occurred and may include, for example, targeted messaging or advertising appearing via push, SMS message, email, in another application, on a web browser, or another device within the same household. The triggered value may be triggered by a specific store, a specific product, or a range of stores and products. Also, the triggered value may attempt to market the user a competing, a complementary, or a similar category.

As can be seen above, a user may be required to perform any number of steps in order to satisfactorily perform an action and receive value. In some instances no steps and/or actions are required to receive value, while in other instances numerous steps and/or actions are required to receive value. It should be understood that, in instances where numerous steps are required, a user may receive value only after satisfactorily performing all steps, a user may receive value after satisfactorily performing each step, or a user may receive value after satisfactorily performing any number of the various required steps. In instances where a user may receive value after satisfactorily performing individual steps or other numbers of steps less than the total number of steps, the user may receive value even if the user does not satisfactorily perform all the steps.

Many other applications (also referred to as "Apps") exist that may be operated on mobile electronic devices or other electronic devices. The systems, apparatuses, and methods disclosed herein may be utilized with other Apps to provide users of the other Apps with value. Such other Apps may be developed by an application developer, which may be any of an individual person, a company or business entity, a software or program capable of developing Apps. The systems, apparatuses, and methods disclosed herein may be utilized with the other Apps in a variety of different manners and value may be provided to users of the other Apps and/or to the application developer in a variety of different forms and manners. For example, value provided to a user may include currency in a game app, phone minutes, advertising removal, etc. Also, for example, value that may be provided to an application developer may include monetary value. The following example scenarios are for illustrative purposes only and are not intended to be limiting upon the disclosed example embodiments. Rather, any possible utilization between the systems, apparatuses, and methods disclosed herein and other Apps, and any manner of providing value to users of the other Apps are intended to be within the spirit and scope of the disclosed example embodiments.

In some example embodiments, an example secondary or other App may include free operation and may include upgraded operation requiring payment to gain access to the upgraded operation. Rather than make a monetary payment for the upgraded operation, a user of the secondary App may have the option to perform functionality associated with the systems, apparatuses, and methods disclosed herein. For example, a user of the secondary App may be able to perform an action such as, for example, checking into a location, scanning product(s) at a particular location, or scanning product(s) at home, etc., similarly to those manners described and illustrated herein, and the user may receive access to the upgraded operation by satisfactorily performing such an action(s). In addition, the application developer of the secondary App may receive monetary value from business entities when the user performs the above listed actions.

It should be understood that the present disclosure may be incorporated with any other or secondary Apps, may be incorporated into other or secondary Apps in any manner, and may provide value to users of the other or secondary Apps in any form, all of which are intended to be within the spirit and scope of the disclosed example embodiments.

It should also be understood that a variety of different manners of interaction between mobile electronic devices and products are disclosed herein, and many other manners of interaction between mobile electronic devices and products are contemplated and are intended to be within the spirit and scope of the disclosed example embodiments. For example, mobile electronic devices may interact with a product by taking a picture of the product or a portion of the product, scanning a barcode or 2D code on the product, radio frequency identification (RFID) or near field communication (NFC) interaction, etc.

In one example embodiment as disclosed herein, a system is provided for providing value to a user based on user activity. In another example embodiment as disclosed herein, a system is provided for verifying user activity. In yet another example, a method of providing value to a user based on user activity is provided. In still another example, a method of verifying user activity is provided. In a further example, an apparatus is provided for providing value to a user based on user activity. In yet a further example, an apparatus is provided for verifying user activity. In still a further example, a method of providing value to a user is provided and includes performing an action with a mobile electronic device, generating data associated with the action, communicating the data to a server via a network, storing the data in a storage device, identifying value using the data, and providing the value to a user. In another example, a method of providing value to a user is provided and includes performing a first action associated with a mobile electronic device, communicating data associated with the first action to a server, performing a second action associated with the mobile electronic device, communicating data associated with the second action to the server, verifying authenticity of at least one of the first action and the second action using the data associated with the first action and the second action, and providing value to the user if the at least one of the first action and the second action is determined to be authentic. In yet another example, a method of verifying a location of a mobile electronic device is provided and includes providing a verification element in a location, the verification element including a memory, a plurality of unique communications stored in the memory, and a broadcast element, broadcasting one of the plurality of unique communications with the broadcast element, receiving the one of the plurality of unique communications with the mobile electronic device, communicating the one of the plurality of unique communications to a server with the mobile electronic device via a network, and verifying the one of the plurality of unique communications is associated with the verification element. In a further example, a method of verifying a location of a mobile electronic device is provided and includes providing a verification element in a location, the verification element may include a memory, a unique id and secret key for generating non-predictable codes from an algorithm, a battery backup clock, a plurality of unique codes generated on the fly or stored in the memory, and a broadcast element broadcasting and periodically changing one of the plurality of unique codes with the broadcast element, receiving the one of the plurality of unique codes with the mobile electronic device, communicating the one of the plurality of unique codes to a server with the mobile electronic via a network, and verifying the one of the plurality of unique codes is associated with the verification element. In still another example, a method of providing value to a user is provided and includes performing an action with a mobile electronic device when the mobile electronic device is without access to a network, the mobile electronic device including a data storage device, generating data associated with the action, storing the data in the data storage device in the mobile electronic device, gaining access to a network with the mobile electronic device, communicating the data to a server via the network when the mobile electronic device has access to a network, and providing value to the user. In a further example, a method of providing value to a user is provided and includes communication data to a mobile electronic device via a network when the network is accessible by the mobile electronic device, the mobile electronic device including a data storage device, storing the data in the data storage device of the mobile electronic device, wherein the data is associated with an action opportunity, prompting a user via the mobile electronic device of the action opportunity when the mobile electronic device does not have access to a network, performing an action, with the mobile electronic device, associated with the action opportunity when the mobile electronic device does not have access to a network, and providing value to the user. In still a further example, a method of providing value to a user is provided and includes operating an application on a mobile electronic device, performing an action with the mobile electronic device when the application is not operating on the mobile electronic device, generating data associated with the action, communicating the data to a server via a network, identifying value using the data, wherein the value is associated with the application, and providing the value to the user. In yet a further example, a method of verifying product interaction is provided and includes providing a product, capturing an image associated with the product with a mobile electronic device, transmitting the image over a network for verification, and verifying that the image is associated with the product.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the disclosed example embodiments have been shown and described, other alternative constructions will be apparent to those of ordinary skill in the art and are within the intended scope of the disclosed example embodiments.

What is claimed is:

1. A verification system comprising:
a memory storing a plurality of verification codes;
a wireless broadcast element;
a timing device configured to generate a time value;
a processing circuit electronically coupled to the memory, the timing device, and the wireless broadcast element, the processing circuit configured to periodically retrieve one of the plurality of verification codes from the memory and to provide the retrieved verification code to the wireless broadcast element, wherein the wireless broadcast element is configured to broadcast the verification code, a plurality of mobile devices receiving the broadcast verification code and sending the verification code to a server; and
the server, wherein the server is configured to incorporate a time offset between a time value of a server clock and the time value of the timing device to synchronize the server with the wireless broadcast element, wherein the server is configured to compare a received verification code to expected server-stored verification codes corresponding to time values within a designated time window, wherein the server is configured to authenticate one or more of the plurality of mobile devices based on whether the received verification code matches one or more expected server-stored verification codes corresponding to time values within the designated time window.

2. The verification system of claim 1 configured to periodically retrieve a different one of the verification codes from the memory and to provide the different verification code to the wireless broadcast element for wireless broadcast, wherein a time period between wireless broadcasts is configurable.

3. The verification system of claim 1 wherein a time period between wireless broadcasts is configurable.

4. The verification system of claim 1 wherein a strength of the wireless broadcast is configurable.

5. The verification system of claim 1 wherein the memory is configured to not receive or alter verification codes after deployment.

6. The verification system of claim 1 wherein the broadcast verification code corresponds to a location of the wireless broadcast element.

7. The verification system of claim 1 configured with an adjustable output strength element to dynamically adjust a signal strength of the wireless broadcast element, wherein the adjustable output strength element is dynamically adjusted via the processing circuit to cause the signal strength of the wireless broadcast element to correspond with a signal transmission range configured to fit a venue in which the verification system is positioned.

8. A method comprising:
periodically retrieving, by a processing circuit, one of a plurality of verification codes from a memory and providing the retrieved verification code to a wireless broadcast element;
broadcasting, by the wireless broadcast element, the verification code;
receiving, by a plurality of mobile devices, the broadcast verification code and sending the verification code to a server;
incorporating, by the server, a time offset between a time value of a server clock and a time value of a timing device to synchronize the server with the wireless broadcast element;
comparing, by the server, a received verification code to expected server-stored verification codes corresponding to time values within a designated time window; and
authenticating, by the server, one or more of the plurality of mobile devices based on whether the received verification code matches one or more expected server-stored verification codes corresponding to time values within the designated time window.

9. The method of claim 8 including periodically retrieving a different one of the verification codes from the memory and providing the different verification code to the wireless broadcast element for wireless broadcast, wherein a time period between wireless broadcasts is configurable.

10. The method of claim 8 wherein a time period between wireless broadcasts is configurable.

11. The method of claim 8 wherein a strength of the wireless broadcast is configurable.

12. The method of claim 8 wherein the memory is configured to not receive or alter verification codes after deployment.

13. The method of claim 8 wherein the broadcast verification code corresponds to a location of the wireless broadcast element.

14. The method of claim 8 including dynamically adjusting a signal strength of the wireless broadcast element to cause the signal strength of the wireless broadcast element to correspond with a signal transmission range configured to fit a venue in which the verification system is positioned.

* * * * *